United States Patent
Chung et al.

(10) Patent No.: US 12,330,722 B2
(45) Date of Patent: Jun. 17, 2025

(54) SYNCHRONIZED MULTI-MODAL ROBOT

(71) Applicant: California Institute of Technology, Pasadena, CA (US)

(72) Inventors: Soon-Jo Chung, La Cañada, CA (US); Alireza Ramezani, Pasadena, CA (US); Elena Sorina Lupu, Pasadena, CA (US); Patrick Spieler, Pasadena, CA (US); Kyunam Kim, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 672 days.

(21) Appl. No.: 17/133,368

(22) Filed: Dec. 23, 2020

(65) Prior Publication Data
US 2021/0370733 A1    Dec. 2, 2021

Related U.S. Application Data

(60) Provisional application No. 62/953,094, filed on Dec. 23, 2019.

(51) Int. Cl.
*B62D 57/04* (2006.01)
*B62D 57/032* (2006.01)
(Continued)

(52) U.S. Cl.
CPC ........... *B62D 57/04* (2013.01); *B62D 57/032* (2013.01); *B64U 10/70* (2023.01); *B64U 60/50* (2023.01)

(58) Field of Classification Search
None
See application file for complete search history.

(56) References Cited

U.S. PATENT DOCUMENTS

| | | | | |
|---|---|---|---|---|
| 7,774,177 B2* | 8/2010 | Dariush | ............... | B62D 57/032 600/595 |
| 7,835,822 B2* | 11/2010 | Goswami | ............. | B62D 57/032 700/250 |

(Continued)

FOREIGN PATENT DOCUMENTS

| | | | | |
|---|---|---|---|---|
| CN | 107943021 A | * | 4/2018 | ........... B62D 57/032 |
| JP | 6168158 B2 | * | 7/2017 | ........... B62D 57/032 |

(Continued)

OTHER PUBLICATIONS

Zhao, M., Anzai, T., & Nishio, T. (2023). Design, Modeling and Control of a Quadruped Robot SPIDAR: Spherically Vectorable and Distributed Rotors Assisted Air-Ground Quadruped Robot. IEEE Robotics and Automation Letters. (Year: 2023).*

(Continued)

*Primary Examiner* — Jelani A Smith
*Assistant Examiner* — Jacob Daniel Underbakke
(74) *Attorney, Agent, or Firm* — KPPB LLP

(57) ABSTRACT

A multi-modal robot that is configured to operate with a bipedal locomotion that may be augmented with aerial locomotion. Many embodiments of a robot may incorporate a robot with a main body portion that houses the various control systems and mechanical controls of the robot. The body of the robot can have a number of different propellers connected to an upper portion of the body and configured to generate lift and/or stability for the body of the robot. Additionally, many embodiments have at least two leg elements connected to a bottom portion of the body by way of a servo mechanism. The legs are configured to provide support for the body of the robot as well as generate a walking locomotion through the movement of the legs.

25 Claims, 20 Drawing Sheets

(51) Int. Cl.
  *B64U 10/70*      (2023.01)
  *B64U 60/50*      (2023.01)

(56) References Cited

U.S. PATENT DOCUMENTS

| | | | |
|---|---|---|---|
| 10,189,519 B2 | 1/2019 | Hurst et al. | |
| 10,576,620 B1* | 3/2020 | Chou | A61F 5/0102 |
| 11,000,945 B2* | 5/2021 | Asada | B25J 9/0006 |
| 2004/0060746 A1* | 4/2004 | Furuta | B25J 19/0091 |
| | | | 180/8.6 |
| 2004/0172165 A1* | 9/2004 | Iribe | B62D 57/032 |
| | | | 700/247 |
| 2005/0209535 A1* | 9/2005 | Dariush | A61B 5/4528 |
| | | | 600/595 |
| 2010/0017028 A1* | 1/2010 | Suga | B62D 57/032 |
| | | | 901/1 |
| 2011/0066283 A1* | 3/2011 | Hammam | B62D 57/032 |
| | | | 700/250 |
| 2013/0079929 A1* | 3/2013 | Lim | B62D 57/032 |
| | | | 700/250 |
| 2015/0196403 A1* | 7/2015 | Kim | A61F 2/70 |
| | | | 623/24 |
| 2017/0121034 A1* | 5/2017 | Fisher | H04N 23/683 |
| 2018/0127092 A1* | 5/2018 | del Castillo | B64U 10/70 |
| 2019/0127052 A1* | 5/2019 | Chen | B64C 39/024 |
| 2020/0122822 A1* | 4/2020 | Bosworth | B64C 39/024 |
| 2020/0140070 A1* | 5/2020 | George | B64U 10/13 |
| 2021/0047035 A1* | 2/2021 | Hoshide | B25J 5/00 |
| 2021/0114203 A1* | 4/2021 | Christensen | B25J 9/1602 |
| 2021/0237265 A1* | 8/2021 | Zhu | B25J 9/1602 |

FOREIGN PATENT DOCUMENTS

| | | | |
|---|---|---|---|
| WO | WO-2009096048 A1 * | 8/2009 | B64C 11/00 |
| WO | 2021102402 A1 | 5/2021 | |

OTHER PUBLICATIONS

L. Daler, J. Lecoeur, p. B. Hählen and D. Floreano, "A flying robot with adaptive morphology for multi-modal locomotion," 2013 IEEE/RSJ International Conference on Intelligent Robots and Systems, Tokyo, Japan, 2013, pp. 1361-1366, (Year: 2013).*

"Hopping Simulation: 4DoF Spherical Parallel Mechanism based Bipedal Robot", Youtube, Oct. 24, 2020, https://www.youtube.com/shorts/vlBgMg9WFfA.

"Mechanical Leg Walking Simulation", Youtube, Oct. 29, 2016, https://www.youtube.com/watch?v=e7-6dLCkdC8.

"Robotic Leg Mechanism", Youtube, Apr. 13, 2020, Retrieved from: https://www.youtube.com/watch?v=YhUXnRzbqGI.

Abourachid et al., "The legs: A key to bird evolutionary success", Journal of Ornithology, Aug. 2012, vol. 53, No. 1, pp. 193-198, published online May 17, 2012, DOI: 10.1007/s10336-012-0856-9.

Ackerman, "Delivery drones use bird-inspired legs to jump into the air", IEEE Spectrum, Jan. 17. 2019, printed Apr. 30, 2021 from https://spectrm/ieee.org/automaton/robotics/dronees/delivery-drones-use-birdinspired-legs-to-jump-into-the-air, 7 pgs.

Asif et al., "On the Improvement of Multi-Legged Locomotion over Difficult Terrains using a Balance Stabilization Method", International Journal of Advanced Robotic Systems, 2012, vol. 9, pp. 1-13DOI: 10.5772/7789.

Bachman et al., "Drive train design enabling locomotion transition of a small hybrid air-land vehicle", 2009 IEEE/RSJ International Conference on Intelligent Robots and Systems, Oct. 2009, pp. 5647-5652, Doi: 10.1109/IROS.2009.5354102.

Baek et al., "Ladybird beetle-inspired compliant origami", Science Robotics, Apr. 15, 2020, vol. 5, eaaz6262, 11 pgs.

Bandyopadhyay et al., "Nonlinear Attitude Control of Spacecraft with a Large Captured Object", Journal of Guidance, Control, and Dynamics, Apr. 4, 2016, vol. 39, No. 4, pp. 754-769, doi: 10.2514/1.G001341.

Bhattacharya et al., "Spherical rolling robot: a design and motion planning studies", IEEE Transactions on Robotics and Automation, Dec. 2000, vol. 6, Issue 6, pp. 835-839, DOI: 10.1109/70.897794.

Boria et al., "A Sensor Platform Capable of Aerial and Terrestrial Locomotion", Proceedings of the IEEE/RSJ International Conference on Intelligent Robots and Systems, 2005, pp. 3959-3964.

Brescianini et al., "An omni-directional multirotor vehicle", Mechatronics, Nov. 2018, vol. 55, pp. 76-93, https://doi.org/10.1016/j.mechatronics.2018.08.005.

Chan et al., "Review of modelling and control of two-wheeled robots", Annual Reviews in Control, Apr. 2013, vol. 37, No. 1, pp. 89-103, DOI: 10.1016/j.arcontrol.2013.03.004.

Crespi et al., "AmphiBot I: an amphibious snake-like robot", Robotics and Autonomous Systems, Mar. 31, 2005, vol. 50, Issue 4, pp. 163-175, https://doi.org/10.1016/j.robot.2004.09.015.

Crowther et al., "Kinematic Analysis and Control Design for a Nonplanar Multirotor Vehicle", Journal of Guidance, Control, and Dynamics, July-Aug. 2011, vol. 34, No. 4, pp. 1157-1171, doi: 10.2514/1.51186.

Daler et al., "A Flying Robot with Adaptive Morphology for Multi-Modal Locomotion", 2013 IEEE/RSJ International Conference on Intelligent Robots and Systems (IROS), Nov. 3-7, 2013, Tokyo, Japan, p. 13961-1366.

Dangol et al., "Performance satisfaction in Harpy, a thruster-assisted bipedal robot", arXiv:2004.14337 [cs/RP], Apr. 29, 2020, 7 pgs.

De Wagter et al., "Design, control, and visual navigation of the DelftaCopter VTOL tail-sitter UAV", Journal of Field Robotics, Sep. 2018, vol. Issue 6, 99. 937-960, first published Apr. 10, 2018, https://doi.org/10.1002/rob.21789.

Dudek et al., "AQUA: An amphibious autonomous robot", Computer, IEEE Xplore, Feb. 2007, vol. 40, No. 1, pp. 46-53, Doi: 10.1109/MC.2007.6.

Earls, "Kinematics and Mechanics of Ground Take-Off in the Starling Sturnis Vulgaris and the Quail Coturnix Coturnix", The Journal of Experimental Biology, 2000, vol. 203, pp. 725-739, published online Jan. 2000.

Fagogenis et al., "Autonomous robotic intracardiac catheter navigation using haptic vision", Science Robotics, Apr. 24, 2019, vol. 4, eaaw1977, 13 pgs.

Feng et al., "Optimization-based Full Body Control for the DARPA Robotics Challenge", Journal of Field Robotics, Dec. 2014, pp. 1-20, DOI: 10.1002/rob.21559.

George et al., "Biomimetic sensory feedback through peripheral nerve stimulation improves dexterous use of a bionic hand", Science Robotics, Jul. 24, 2019, vol. 4, eaax2352, 12 pgs.

Ghassemi et al., "Feasibility study of a novel robotic system BALLU: Buoyancy assisted lightweight legged unit", Proceedings of the 16th IEEE International Conference of Humanoid Robots, 2016, pp. 144.

Grizzle et al., "Models, feedback control, and open problems of 3D bipedal robotic walking", Automatica, Aug. 2014, vol. 50, Issue 8, pp. 1955-1988, https://doi.org/10.1016/j.automatica.2014.04.021.

Grotzinger et al., "Mars Science Laboratory Mission and Science Investigation", Space Sci. Rev., 2012, vol. 170, pp. 5-56, DOI 10.1007/s11214-012-9892-2.

Haldane et al., "Robotic vertical jumping agility via series-elastic power modulation", Science Robotics, Dec. 6, 2016, vol. 1, eaag2048, 9 pgs.

Hang et al., "Perching and resting—A paradigm for UAV maneuvering with modularized landing gears", Science Robotics, Mar. 13, 2019, vol. 4, eaau6637, 11 pgs.

Heredia et al., "Control of a multirotor outdoor aerial manipulator", 2014 IEEE/RSJ International Conference on Intelligent Robots and Systems (IROS 2014), Sep. 2014, pp. 3417-3422, DOI: 10.1109/IROS.2014.6943038.

Hoover et al., "RoACH: An autonomous 2.4g crawling hexapod robot", IEEE Xplore, IEEE/RSJ International Conference on Intelligent Robots and Systems (IROS), 2008, Oct. 2008, pp. 26-33., DOI: 10.1109/IROS.2008.4651149.

Hubicki et al., "Walking and Running with Passive Compliance: Lessons from Engineering a Live Demonstration of the ATRIAS Biped", IEEE Robotics and Automation Magazine, Sep. 2016, pp. 1-16.

(56) References Cited

OTHER PUBLICATIONS

Hwangbo et al., "Learning agile and dynamic motor skills for legged robots", Science Robotics, Jan. 16, 2019, vol. 4, eaau5872, 14 pgs.

Hyun et al., "High speed trot-running: Implementation of a hierarchical controller using proprioceptive impedance control on the MIT Cheetah", The International Journal of Robotics Research, Sep. 1, 2014, vol. 33, Issue 11, pp. 1417-1445, published online Aug. 21, 2014, https://doi.org/10.1177/0278364914532150.

Ijspeert et al., "From Swimming to Walking with a Salamander Robot Driven by a Spinal Cord Model", Science, Mar. 9, 2007, vol. 315, Issue 5817, pp. 1416-1420, DOI: 10.1126/science. 1138353.

Johnson et al., "Team IHMC's lessons learned from the DARPA robotics challenge trials", Journal of Field Robotics, Mar. 2015, vol. 32, No. 2, pp. 192-208, DOI: 10.1002/rob.21571.

Joshi et al., "Design and analysis of a spherical mobile robot", Mechanism and Machine Theory, Feb. 2010, vol. 45, Issue 2, pp. 130-136, https://doi.org/10.1016/j.mechmachtheory.2009.04.003.

Kalantari et al., "Design and experimental validation of HyTAQ, a Hybrid Terrestrial and Aerial Quadrotor", 2013 IEEE International Conference on Robotics and Automation, May 6-10, 2013, pp. 4445-4450, DOI: 10.1109/ICRA.2013.6631208.

Kim et al., "Controllability and Design of Unmanned Multirotor Aircraft Robust to Rotor Failure", AIAA Scitech 2019 Forum, 2019, pp. 1-10.

Kim et al., "Fully Autonomous Vision-Based Net-Recovery Landing System for a Fixed-Wing UAV", IEEE/Asme Transactions on Mechatronics, Aug. 2013, vol. 18. No. 4, pp. 1320-1333, DOI: 10.1109/TMECH.2013.2247411.

Kim et al., "Operating an unknown drawer using an aerial manipulator", Proceedings—IEEE International Conference on Robotics and Automation 2015 Jun. 2015, pp. 5503-5508, DOI: 10.1109/ICRA.2015.7139968.

Kim et al., "Rolling Locomotion of Cable-Driven Soft Spherical Tensegrity Robots", Soft Robotics, 2020, vol. 7, No. 3, pp. 346-362, DOI: 10.1089/soro.2019.0056.

Kossett et al., "A robust miniature robot design for land/air hybrid locomotion", 2011 IEEE International Conference on Robotics and Automation, May 9-13, 2011, pp. 4595-4600, DOI: 10.1109/ICRA.2011.5979845.

Kovac et al., "Towards a self-deploying and gliding robot", Flying Insects and Robots, 2009, pp. 271-284, first online Aug. 22, 2009, DOI: https://doi.org/10.1007/978-3-540-89393-6_19.

Lee et al., "A neuro-inspired artificial peripheral nervous system for scalable electronic skins", Science Robotics, Jul. 17, 2019, vol. 4, eaax2198, 16 pgs.

Lim et al., "Robot System of DRC-HUBO+ and Control Strategy of Team KAIST in DARPA Robotics Challenge Finals", Journal of Field Robotics, Jun. 2017, First Published Sep. 29, 2016, vol. 34, No. 4, pp. 802-829, doi: 10.1002/rob.21673.

Lohmiller et al., "On Contraction Analysis for Nonlinear Systems", Automatica, 1998, vol. 34, pp. 683-696.

Ma et al., "Controlled Flight of a Biologically Inspired, Insect-Scale Robot", Science, May 3, 2013, vol. 340, Issue 6132, pp. 603-607, DOI: 10.1126/science.1231806.

Maekawa et al., "Pseudo-Locomotion Design with a Quadrotor-Assisted Biped Robot", Proceedings of the 2018 IEEE, International Conference on Robotics and Biomimetics, Dec. 12-15, 2018, Kuala Lumpur, Malaysia, DOI:10.1109/ROBIO.2018.8665340.

Mahler et al., "Learning ambidextrous robot grasping policies", Science Robotics, Jan. 16, 2019, vol. 4, eaau4984, 12 pgs.

Mahony et al., "Multirotor Aerial Vehicles: Modeling, Estimation, and Control of Quadrotor", IEEE Robotics & Automation Magazine, Sep. 2012, vol. 9, Issue 3, pp. 20-32, first published Aug. 27, 2012, DOI: 10.1109/MRA.2012.2206474.

Morton et al., "A small hybrid ground-air vehicle concept", Conference: 2017 IEEE/RSJ International Conference on Intelligent Robots and Systems (IROS), Sep. 2017, pp. 5149-5154, DOI: 10.1109/IROS.2017.8206402.

Nelson et al., "The PETMAN and Atlas Robots at Boston Dynamics", In book: Humanoid Robotics: A Reference, Jan. 2019, pp. 169-186, DOI: 10.1007/978-94-007-6046-2_15.

Nguyen et al., "A Novel Robotic Platform for Aerial Manipulation Using Quadrotors as Rotating Thrust Generators", IEEE Transactions on Robotics, Feb. 2018, vol. 34, No. 2, pp. 353-369, DOI: 10.1109/TRO.2018.2791604.

Norton et al., "Analysis of Human-robot Interaction at the DARPA Robotics Challenge Trials", Journal of Field Robotics, Jun. 1, 2017, vol. 36, Issues 5-7, pp. 483-513, first published online Feb. 9, 2017, DOI: 10.1177/0278364916688254.

Paranjape et al., "Novel Dihedral-Based Control of Flapping-Wing Aircraft With Application to Perching", IEEE Transactions on Robotics, Oct. 2013, vol. 29, Issue 5, pp. 1071-1084, DOI: 10.1109/TRO.2013.2268947.

Peterson et al., "A wing-assisted running robot and implications for avian flight evolution", Bioinspiration & Biomimetics, Dec. 3011, vol. 6, No. 4, 046008. published online Oct. 17, 2011, 8 pgs., DOI: 10.1088/1748-3182/6/4/046008.

Pratt et al., "Dynamic Underactuated Flying-Walking (DUCK) Robot", 2016 IEEE International Conference on Robotics and Automation (ICRA) Stockholm, Sweden, May 16-21, 2016, pp. 3267-3274, DOI: 10.1109/ICRA.2016.7487498.

Ramezani et al., "A biomimetic robotic platform to study flight specializations of bats", Science Robotics, Feb. 1, 2017, vol. 2, eaal2505, 27 pgs.

Roderick et al., "Touchdown to take-off: at the interface of flight and surface locomotion", Interface Focus, Feb. 6, 2017, vol. 7, No. 1, 20160094, pp. 1-15, doi: 10.1098/rsfs.2016.0094.

Ruggiero et al., "A multilayer control for multirotor UAVs equipped with a servo robot arm", Proceedings—IEEE International Conference on Robotics and Automation, Jun. 2015, pp. 4014-4020, DOI: 10.1109/ICRA.2015.7139760.

Savoie et al., "A robot made of robots: Emergent transport and control of a smarticle ensemble", Science Robotics, Sep. 18, 2019, vol. 4, eaax4316, 11 pgs.

Shakhatreh et al., "Unmanned Aerial Vehicles (UAVs): A Survey on Civil Applications and Key Research Challenges", IEEE Access, Apr. 9, 2019, vol. 7, pp. 48572-48634, DOI: 10.1109/ACCESS.2019.2909530.

Shepherd et al., "Multigait soft robot", PNAS, Dec. 20, 2011, vol. 108, No. 51, pp. 20400-20403, DOI: 10.1073/pnas. 1116564108.

Shi et al., "Adaptive Nonlinear Control of Fixed-Wing VTOL with Airflow Vector Sensing", 2020 IEEE International Conference on Robotics and Automation (ICRA), May-Aug. 2020, pp. 5321-5327, DOI: 10.1109/ICRA40945.2020.9197344.

Shi et al., "Nonlinear Control of Autonomous Flying Cars with Wings and Distributed Electric Propulsion", in 2018 IEEE Conference of Decision and Control (CDC), 2018, pp. 5326-5333, DPO: 10.1109/CDC.2018.8619578.

Tâche et al., "Magnebike: A magnetic wheeled robot with high mobility for inspecting complex-shaped structures", Journal of Field Robotics, May 2009, vol. 26, Issue 5, pp. 453-476, https://doi.org/10.1002/rob.20296.

Triebel et al., "Spencer: A Socially Aware Service Robot for Passenger Guidance and Help in Busy Airports", Part of the Springer Tracts in Advanced Robotics book series, in Proceedings of the 10th Conference on Field and Service Robotics, 2015, vol. 113, pp. 607-622.

Veloso et al., "CoBots: Robust Symbiotic Autonomous Mobile Service Robots", IJCAI'15: Proceedings of the 24th International Conference on Artificial Intelligence, Jul. 2015, pp. 4423-4429.

Wang et al., "Design and Modeling of a Novel Transformable Land/Air Robot", International Journal of Aerospace Engineering, Feb. 4, 2019, vol. 2019, Article ID 2064131, 10 pages, https://doi.org/10.1155/2019/2064131.

Wu et al., "Insect-scale fast moving and ultrarobust soft robot", Science Robotics, Jul. 31, 2019, vol. 4, eaax1594, 10 pgs.

Yang et al., "Sliding mode control for trajectory tracking of nonholonomic wheel mobile robots", IEEE Transactions on Robotics and Automation, Jun. 1999, vol. 15, No. 3, pp. 578-587.

(56) References Cited

OTHER PUBLICATIONS

Zufferey et al., "A 10-gram Vision-based Flying Robot", Advanced Robotics, Oct. 2007, vol. 21, No. 14, pp. 1671-1684, DOI: 10.1163/156855307782227417.
Daler, Thesis, Ecole polytechnique federale de Lausanne, Lausanne, Switzerland, 2015.
Kajita et al., "Introduction to Humanoid Robotics", Springer, 2014.
Rezazadeh et al., "Control of ATRIAS in three dimensions: Walking as a forced-oscillation problem", The International Journal of Robotics Research, vol. 39, No. 7, May 31, 2020, 23 pgs., DOI: 10.1177/0278364920916777.
Yanco et al., "Analysis of Human-robot Interaction at the DARPA Robotics Challenge Trials", Journal of Field Robotics, May 2015, vol. Issue 3, Special Issue: DARPA Robotics Challenge (DRC), pp. 420-444, https://doi.org/10.1002/rob.21568.

\* cited by examiner

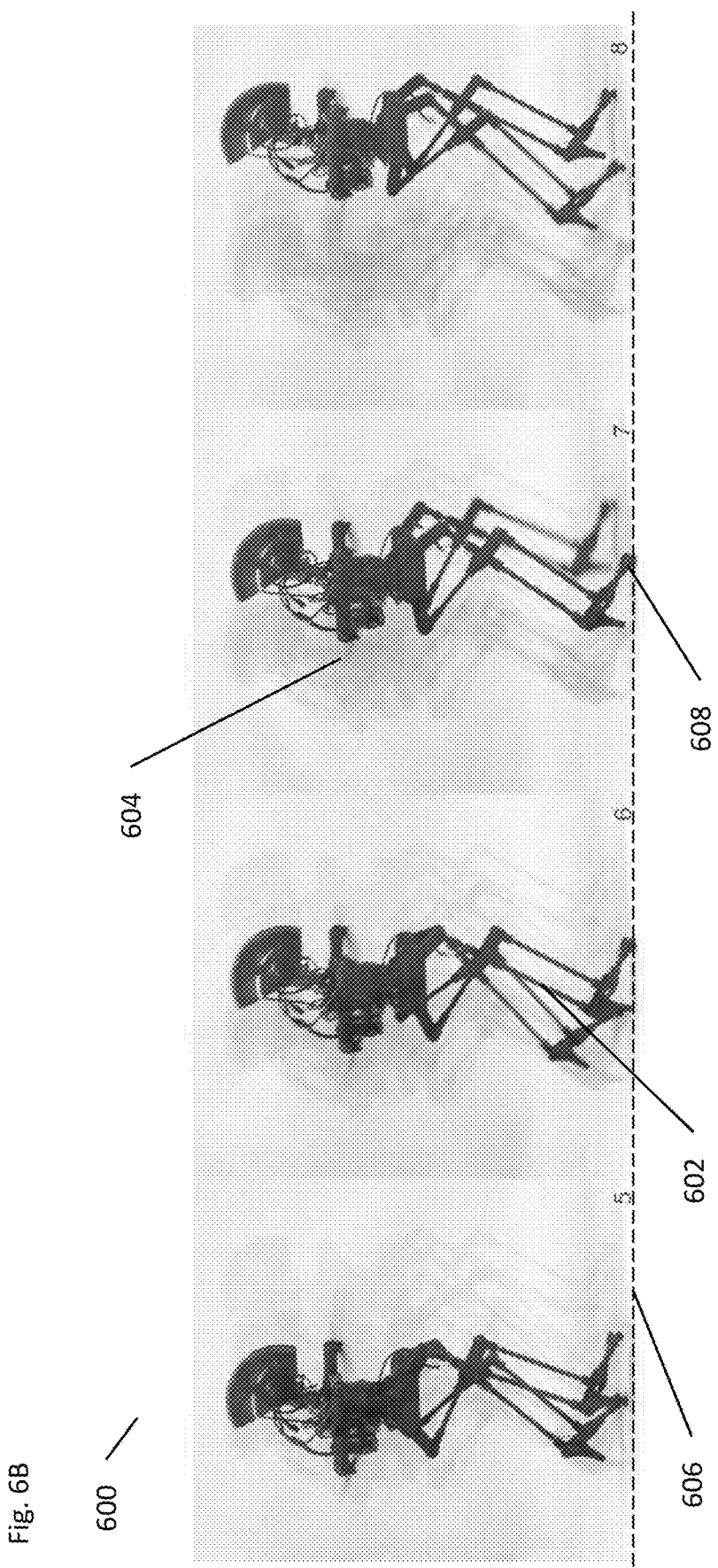

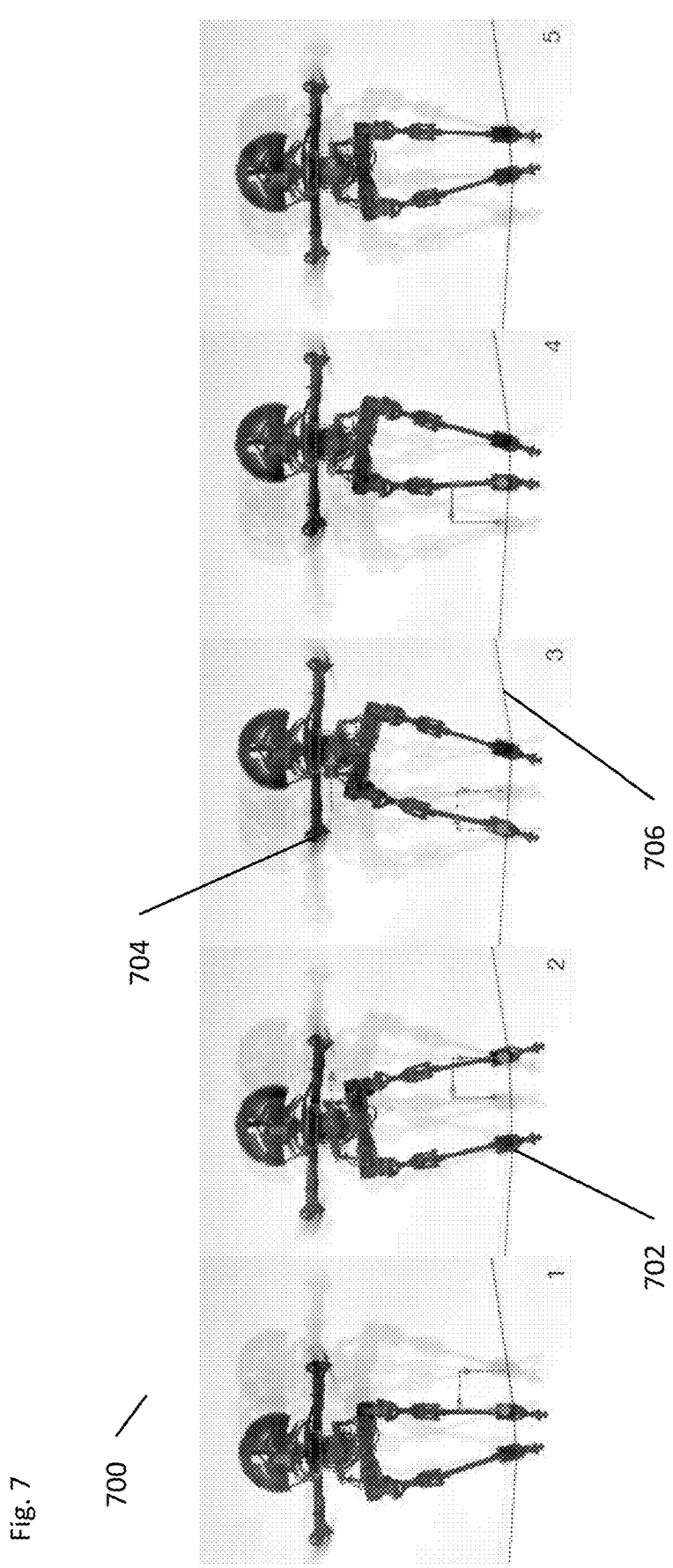

SYNCHRONIZED MULTI-MODAL ROBOT

CROSS-REFERENCE TO RELATED APPLICATIONS

The present invention claims priority to U.S. Provisional Patent Application Ser. No. 62/953,094 entitled "LEONARDO: Synchronized Aerial And Legged Robot", filed 23 Dec. 2019, the disclosures of which is herein incorporated by reference in its entirety.

FIELD OF THE INVENTION

This invention generally relates to robots using more than one method of locomotion. More specifically, the invention relates to a multi-modal robot that utilizes synchronized control systems to actuate the various modes of locomotion.

BACKGROUND

Numerous ground robots in various forms have been studied and developed over the past several decades, which may be categorized by their main locomotion methods, for instance, legged, wheeled, rolling, and/or crawling. Particularly, bipedal robots have attracted great attention not only because of their human-like body shapes, but also because they can perform versatile and robust walking, running, and jumping on uneven terrains. Some advanced humanoids can even execute high-level tasks like object manipulation, ladder climbing, or driving a vehicle. The numerous developments in robotics has been mainly directed to achieving a bipedal robot that exhibits human-like stability and robustness in its walking and running maneuvers over a challenging terrain or in a complex indoor environment.

The safe mobility of ground robots is also hindered by unfavorable ground conditions and the existence of obstacles of various sizes. This limits their practical applications to be within well-structured environments such as indoor service robots or vacuum cleaners. It also necessitates them to be a highly-engineered system with high development costs, as it can be seen from some examples of space exploration rovers or advanced humanoid robots. In addition, the applications of ground robots are restricted to movements that occur on or near the ground, as it can be challenging for the robots to gain access to an elevated location.

Some of the aforementioned difficulties can be overcome with aerial robots that have the ability to fly over and around obstacles of many shapes and sizes. Such aerial robots have been another area of interest with respect to robotics.

Both fixed-wing and rotary-wing aircraft as well as their hybrid have been studied extensively and are proposed for real-world applications such as remote sensing, delivery, search and rescue, surveillance, and real-time monitoring. However, these robots come with their drawbacks, including large energy consumption, short flight and operation time, and limited on board resources and payload weight. Furthermore, aerial robots have more difficulty than ground robots in physically interacting with their environment or other robots because they need to stabilize themselves against gravity in mid-air. Any unknown external disturbances arising from such interactions may fail their control system and cause a disastrous crash. Therefore, aerial robots and their variants have been mainly envisioned for applications that involve little to no physical interactions such as visual inspections.

An area of growing interests has been robots with multi-modal robots that offer various modes of locomotion. However, more traditional mechanical designs and/or control system methodologies have prevented much advancement in the area of multi-modal robotics.

SUMMARY OF THE INVENTION

The invention described herein generally relates to a multi-modal robot that is configured to operate in a walking mode augmented with aerial locomotion. Many embodiments are directed to a multi-modal robot with a body configured to house a plurality of control electronics, where the plurality of control electronics includes at least a leg controller and at least one flight controller. The multi-modal robot also has a plurality of motor elements disposed within the body. Additionally, there are at least two leg elements each of the at least two leg elements are connected to at least one of the plurality of motor elements and have a proximal portion and a distal portion where the proximal portion is move-ably connected to the motor elements and disposed near a bottom portion of the body. Furthermore, each of the two leg elements has a foot element disposed on the distal portion and has a top and a bottom surface wherein the foot element comprises a contact sensor disposed on the bottom surface. The contact sensor is in communication with the at least one leg controller and the at least one flight controller. Many embodiments include a plurality of propellers disposed on a top portion of the body where each of the plurality of rotors are in communication with the at least one flight controller and the at least one leg controller and configured to generate a thrust force. The robot is configured to operate between at least a walking mode and at least a flight mode and wherein the control electronics operate to smoothly transition between the walking mode and the flight mode. While in the walking mode the at least two leg elements are configured to support the weight of the robot and wherein each of the leg elements can move in a plurality of directions such that the movement of the legs enables the movement of the overall robot, and the plurality of propellers provide a sufficient amount of lift so as to provide stability of the robot during the walking mode. While in the flight mode the at least one flight controller is configured to operate the plurality of propellers such that the thrust force generated from the plurality of propellers generates sufficient lift to elevate the robot above the ground and wherein at least one flight controller controls the plurality of propellers to move the robot in a any number of directions.

In other embodiments, each of the plurality of propellers are positioned at an angle leaning inwards towards the body of the robot.

In still other embodiments, the tilt direction can be at any orientation and the tilt amount can be between 0 and 90 degrees.

In yet other embodiments, the tilt is directed inwards at a 25 degrees angle with respect to the torso vertical axis and directed inwards at a 45 degrees angle in the horizontal plane with respect to the forward direction.

In still yet other embodiments, each of the two leg elements comprise a plurality of moveably interconnected segments, wherein the moveably interconnected segments form an upper kinematic loop and a lower kinematic loop such that each of the kinematic loops can be controlled in a manner so as to allow the robot to operate in the walking mode.

In other embodiments, the contact sensor has an active position and an inactive position, wherein the active position communicates a signal to the leg controller and the at least one flight controller thus indicating the need to perform in the walking mode and wherein when the contact sensor is in the inactive position for an elongated period of time a signal is communicated to the at least one flight controller thus indicating the need to perform in the flight mode.

In still other embodiments, the multi-modal robot has a control computer disposed in the body of the robot wherein the control computer is in signal communication with the at least one leg controller and the at least one flight controller to communicate a transition between the walking mode and the flight mode.

In yet other embodiments, the multi-modal robot has a plurality of sensors disposed around the body of the robot and in signal communication with the control computer, and wherein each of the plurality of sensors transmits a sensor signal to the control computer wherein the control computer utilizes the sensor signal to determine the movement needed from the legs and the propellers in order to navigate the robot.

In still yet other embodiments, each of the plurality of sensors is selected from a group consisting of gyroscope, magnetometer, camera, ultrasonic sensor, and IR sensor.

In other embodiments, the foot element further comprises a heel disposed on the bottom surface of the foot element.

In still other embodiments, the contact sensor is disposed within a toe of the foot element.

In yet other embodiments, the walking mode is based on an inverted pendulum model.

Other embodiments are directed to a method for operating a multi-modal robot which includes the following:
utilizing a control computer disposed within a body of the robot to receive signal inputs from a plurality of sensors;
determining a mode of operation based on the signal inputs from the plurality of sensors;
activating a leg controller in response to the signal inputs and initiating a walking mode, wherein the walking mode utilizes the leg controller to control the movement of at least two legs such that the movement of the at least two legs moves the robot; and
activating a flight controller in response to the signal inputs such that the flight controller activates a plurality of propellers such that the propellers generate an amount of lift to the robot so as to provide stability for walking.

In other embodiments, at least one of the plurality of sensors is a contact sensor disposed on a bottom portion of each of the at least two legs such that the impact of each of the two legs with a solid surface will place the contact sensor in an active state.

In still other embodiments, the method includes removing each of the at least two legs from the solid surface thereby placing the contact sensor in a deactivated state and transmits the deactivated state to the leg controller and the flight controller such that the flight controller engages the plurality of rotors to generate sufficient lift to raise the robot off of the solid surface and begin a flight mode.

In yet other embodiments, the mode of operation is selected from a group consisting of flight, walking, and transition.

In still yet other embodiments, each of the plurality of propellers are configured at an angle towards the body of the robot.

In other embodiments, the tilt direction can be at any orientation and the tilt amount can be between 0 and 90 degrees.

In still other embodiments, the tilt is directed inwards at a 25 degrees angle with respect to the torso vertical axis and directed inwards at a 45 degrees angle in the horizontal plane with respect to the forward direction.

In yet other embodiments, each of the two leg elements comprise a plurality of moveably interconnected segments, wherein the moveably interconnected segments form an upper kinematic loop and a lower kinematic loop such that each of the kinematic loops can be controlled in a manner so as to allow the robot to operate in the walking mode.

In still yet other embodiments, the thrust force from the plurality of propellers is minimized to provide only stabilization support for the walking mode such that an amount of energy consumption is accordingly minimized.

Other embodiments are directed towards, a method for operating a multi-modal robot that includes the following processes:
utilizing a control computer to receive signal inputs from a plurality of sensors;
determining a mode of operation based on the signal inputs from the plurality of sensors; and
activating a flight controller in response to the signal inputs such that the flight controller activates a plurality of propellers such that the propellers generate an amount of lift sufficient to produce a flight mode for the robot and wherein the plurality of rotors further generate the thrust and lift necessary to maintain a stable flight mode Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein;

FIGS. 6A and 6B are pictorial illustrations of a multi-modal robot in a walking mode configuration in accordance with embodiments of the invention FIG. 7 is a pictorial illustration of a robot walking along a tensioned line in accordance with embodiments of the invention

DETAILED DESCRIPTION

Figure 1:
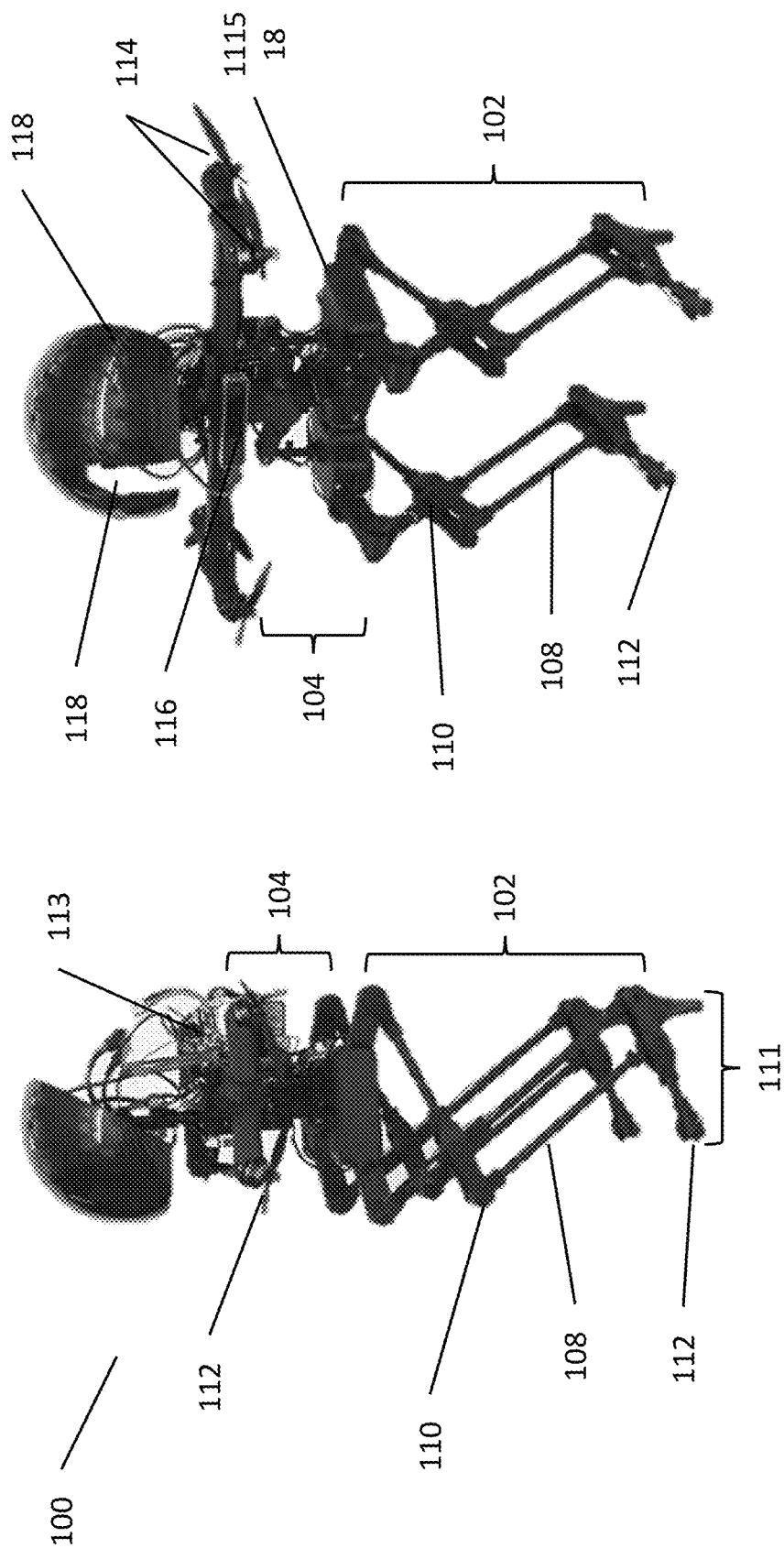
FIG. 1 illustrates an embodiment of a multi-modal robot in accordance with embodiments of the invention

Turning now to the drawings, embodiments of a multi-modal robot configured with various modes of locomotion including walking, flying, and/or transitioning between different modes of locomotion are illustrated. In a number of embodiments the robot has a body element that has an internal chassis. The internal chassis is configured to house a number of control elements capable of controlling the robot. Many embodiments have at least two leg elements connected to the bottom of the body element and configured to provide support to the body of the robot. The leg elements are connected to walking control mechanisms within the body of the robot that control the movement of each of the leg elements. A number of embodiments have a plurality of propellers connected an upper portion of the body of the robot. The plurality of propellers is configured to provide stability to the robot during the walking phase. Additionally, the plurality of propellers generates lift such that the robot can operate in a flying mode.

Robots with a multi-modal locomotion ability have drawn much attention over the past couple of decades due to their advantages over robots having only a single mode of locomotion, such as moving through challenging environments by appropriately switching between available locomotion modes or having flexibility with the execution of their missions. While some previous works presented terrestrial and aquatic locomotion abilities, others attempted to develop hybrid ground and aerial locomotion robots. Some of these robots adopted a fixed-wing to take advantage of its endurance and efficiency combined with wheel-legs or "whegs" to enable ground locomotion.

Arguably, a significant challenge for these robots is to successfully transition from ground locomotion to flight by accelerating their forward speed to make their wing-borne lift force large enough for take-off. Several approaches have been proposed to address this issue, including rooftop take-off, gliding after jumping with spring-loaded legs, or adding propellers to enable vertical take-off, at the expense of increased mechanical complexity.

However, the realization of these robots in practice has been a challenge with newly posed research problems in a wide range of areas including mechanical design, modeling and analysis, control system design, manufacturing, and experimental validation To overcome the difficulty, hybrid locomotion robots using rotary wings for aerial locomotion have been developed. Some efforts have been made to develop transformable robots that fold/unfold a tail mechanism and propeller blades to fly similar to a helicopter. Many prior works in this direction adopt an aerial propulsion system resembling a quad propeller that is capable of highly agile and maneuverable flight. Among them, some robots employ passive devices for their ground locomotion like a rolling cage or a passive dynamic walker. However, such methods rely on propeller thrust to drive ground locomotion which is usually expensive and the proposed designs exhibit limited versatility and adaptability on rough terrains. Others utilize actuated wheels as they are mechanically simple, but they too have limited adaptability on complex terrains. Furthermore, these designs involve a transformation mechanism to protect propellers during ground locomotion. The propellers are close to the ground when the robots are wheel-driven and can potentially be damaged from ground obstacles without proper protection.

Bio-inspired aerial robots have been one area of focus because controlled flying maneuvers, terrestrial and aerial bi-modal locomotion is a form of locomotion that is commonly found in animals such as insects, bats, and birds. Birds, in particular, fly to move a long distance to forage, to flee from predators, or to migrate for a better climate. Still, their multi-purpose legs are what drove their evolutionary success as they enable multiple movement modalities on the ground that are essential for terrestrial foraging like ground mobility including walking, running, jumping, resting and perching. Additionally, some birds use legs to provide a significant amount of thrust for take-off.

Accordingly, many embodiments are directed to robots with various bio-inspired designs capable of multiple modes of operation in a synchronized manner to enable the robot to maneuver on a variety of different terrains. FIG. 1, for example, illustrates an embodiment of a multi-modal robot 100 with a pair of legs 102 that are positioned beneath the main body 104 of the robot. The legs can be configured in accordance with a number of different designs such that they provide general support for the body of the robot and provide modality in a walking mode for the robot 100. In a number of embodiments, the legs 102 may be constructed of multiple segments 108 that are interconnected at various connection points 110 that allow for the movement of the legs 102 as well as provide sufficient support for the body 104. The legs 102 may be connected to a foot element 111 positioned at the base of each of the legs 102 where the foot 111 is configured to contact the ground during walking and/or takeoff and landing modes. Additionally, the foot element 111 may be configured with one or more contact sensors 112. The contact sensors can be connected to control electronics 113 within the body of the robot 104 and configured to indicate the need to transition between different modes of locomotion. Furthermore, the contact sensors 112 can have a cover such as a half sphere rubberized cover that protects the sensor and allows for a high friction surface for the foot 111 to contact the ground.

In accordance with numerous embodiments, the contact sensors 112 may transmit signals to the control electronics 113 which indicate the need to change between walking mode and/or flight mode as well as the need to transition between different modes of locomotion. For example, when only one foot sensor 112 is in contact with the ground could indicate the need to transition between flight and/or walking. Accordingly, in order to enable multiple modes of locomotion, many embodiments may be equipped with multiple propellers 114 positioned at a shoulder point of the body of the robot 100. The propellers can be connected to the body through an elongated shaft that extends outward from the body and has one end with the propeller. The shaft can allow for electrical connections to be hidden and protected from the propellers. The propellers 114 can be used to stabilize the robot during walking mode as well as generate a sufficient amount of lift to allow the robot 100 to operate in a flying mode.

In various embodiments, the legs of the robot 100 may be configured to be lightweight to reduce the overall weight of the robot. This feature makes the robot more agile during walking mode and increases the endurance of the robot in flying mode. Accordingly, leg elements 108 can be manufactured from a number of different materials and/or methods such as carbon fiber, plastic, or metal that is machined in a lightweight manner. For example, some embodiments can be made from titanium, steel, aluminum, or an number of different alloys, which may not necessarily be light weight. However, various embodiments can have leg elements that are machined with various holes or openings within the element that reduce the weight while maintaining a stiffness and strength necessary to support the robot 100. Additionally, some leg elements 108 may be manufactured using additive manufacturing. The leg elements 108 connected by one or more joints 110 may be reinforced with nylon joints and/or ball bearings.

In accordance with numerous embodiments, the geometry and physical configuration of the legs 108 can be designed to allow a more compact design as well as to reduce the overall weight of the robot, thus improving the overall efficiency in walking and flying modes. For example, the individual leg element 108 can be interconnected via a number of different mechanical connections to create two closed kinematic loops where the first loop is the upper portion and the second loop is the lower portion of the legs. This configuration can allow for the actuators 120 to be positioned within the body or torso of the robot 100. This allows for a more stable configuration to help maintain a fixed center of mass within the torso of the robot. The actuators can be servo motors, electric motors such as brushless electric motors, or any other motor that can reasonably actuate the desired motion of the legs. Accordingly, the configuration of the leg elements 102 and associated actuators can provide a stable support system for the body and other components of the robot when not in motion as well as during a walking mode. The actuators can also be configured to allow for the movement of the legs in a multiple directions such as forward, backward, and side motions, in accordance with many embodiments.

Some embodiments of the robot may be configured with the ability to utilize additional sensors (116 and 118) at different locations on the robot. The additional sensors (116 and 118) can provide additional input to the controllers (not shown) to allow the robot to navigate a number of different terrains. For example, some embodiments may have cameras or some type of visual detection sensor that can be used to improve navigation of rough and uncertain terrain or can be used to implement autonomous operation. Other embodiments may include accelerometers, navigation sensors, magnetometers etc. to help improve the autonomous capabilities of the robot. In addition to the sensor elements 112 within feet 111, the body of the robot may be configured with a number of different body sensors 116 and 118. The body sensors 116 and 118 may be positioned within the body of the robot 104 or in a head portion 120 of the robot. The sensors can be any number of sensors to allow for improved locomotion whether in flying, walking or transition modes. For example, the body sensors may be cameras, accelerometers, ultrasonic sensors etc. The Methods for the various modes of operation and transitions will be described later herein.

As the robot 100 may be configured to operate between different modes of locomotion, the propellers 114 may be positioned in a number of different configurations to allow for increased stability and improved flight characteristics. For example, in many embodiments, the propellers may be tilted inward towards the body of the robot at an angle to help control the moment forces that can be generated by the propellers. This can help to control the robot during the various modes of locomotion. In numerous embodiments the propellers may be tilted or angled at various angles so long as all three rotation axis are independently controllable. This can help to improve the walking trajectories of the robot by providing improved stability for the legs while walking. Additionally, the ability of the propellers to be tilted or angled can allow for improved controllability during flight modes of the robot.

Control Architecture

The hybrid nature of the robot locomotion dynamics may utilize a controller that uses the contact state of the feet with the ground to determine the operational mode of the robot. For example, some embodiments may utilize individual feedback controllers in synchronization to stabilize the different operational modes. The terms operational modes refers to ground contact with one foot, ground contact with two feet, or flying with no feet in contact with the ground. Additionally, many embodiments may incorporate a transition mode in which the robot is configured to transition between walking and/or flying.

As described above, the robot can be equipped with multiple on-board computers or controllers designed to run the control architecture of the robot and subsequently manage the various modes of operation of the robot 100. The computers can be configured to interface with the various sensors in the body and on the feet as well as the various motor controllers that operate the legs during walking mode and/or the propellers for stabilization and flight. In some embodiments the computers can be selected from a number of different types such as a NanoPC-T4 that can be used to interface with sensors or human commands, to estimate states based on sensor readings, and to compute control signals. Other embodiments may have a second control computer that can run at a higher loop rate and can be used for computing attitude control signals and sending actuation commands to propeller motors and leg servo motors. In addition, the second computer can contain an inertial measurement unit (IMU), which together with a stereo vision camera mounted on the torso can serves as an input to a Kalman filter-based on-board state estimator. The on/off switch embedded into the feet for ground detection can also be wired to the torso computer, and their signals serve as a trigger for switching between walking and flight controllers, as well as to know whether a stance or swing leg trajectory should be used for the nonlinear tracking controller for walking.

Figure 2:
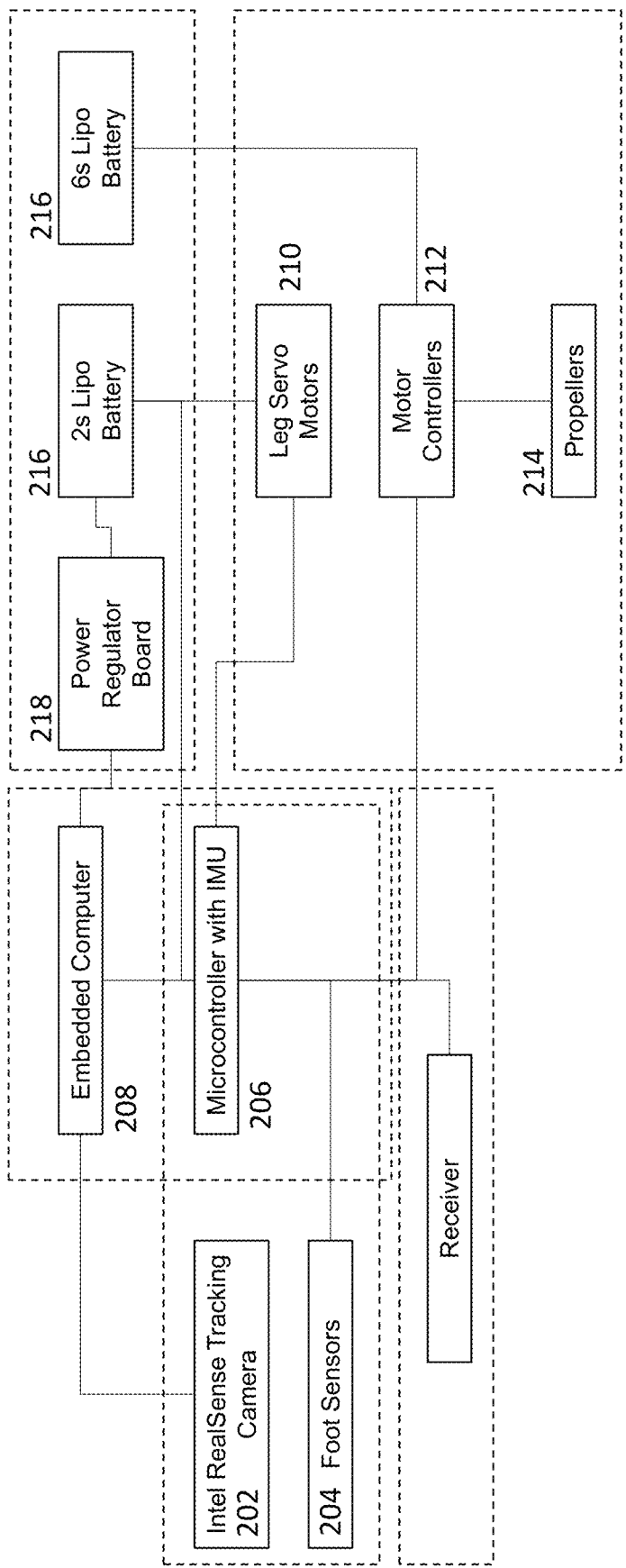
FIG. 2 illustrates control architecture of a robot in accordance with embodiments of the invention

As can be appreciated, the combination of the leg actuators, propellers, and computer control devices can be used to allow for the robot to perform a number of different modes of operation as discussed previously. FIG. 2 illustrates a control architecture in accordance with numerous embodiments, that can be used to generate the various moments and thrust controls required for a multi-modal robot. For example, many embodiments may have a camera or other sensors 202 along with the foot sensors 204 that are connected to and feed input signals to a microcontroller 206 and/or an embedded computer 208. Accordingly, such signals can be processed and used to generate motion in the leg servo motors 210 and the motor controllers 212 of the propellers, 214 respectively. Since various embodiments may be designed to operate un-tethered, the control architecture can include the power input from various battery elements 216 and a power regulator 218. The power regulator 418 can be used to regulate the power used by various motor controllers for the legs and/or the propellers during the various modes of operation.

Figure 3B:
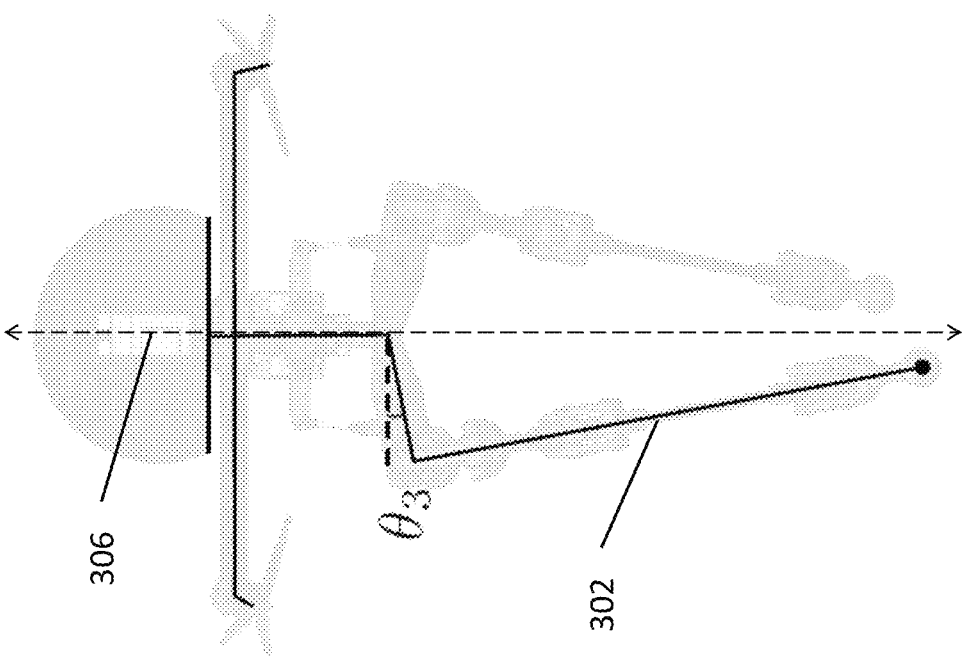
FIGS. 3A and 3B illustrate a side and front view of a force body diagram of a robot in accordance with embodiments of the invention.
Figure 3A:
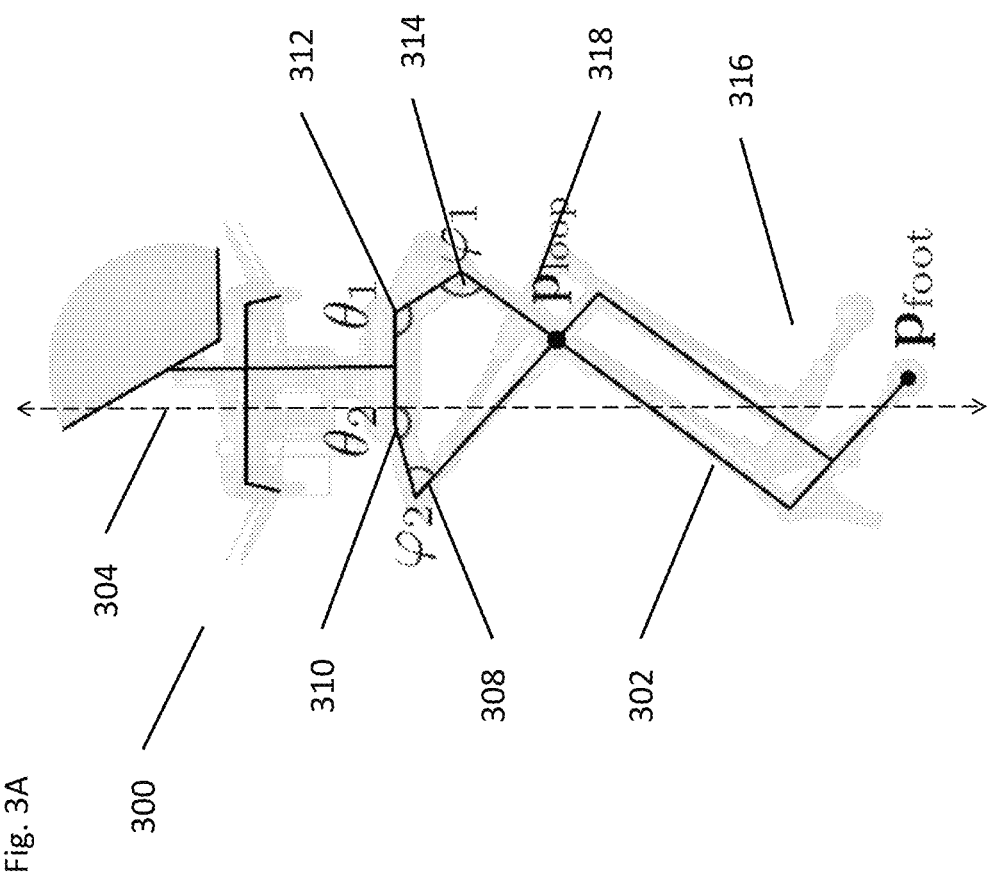

As described above, many embodiments can be configured with a number of different motors to control the movement of the leg elements and/or propellers. For example, FIG. 3A shows a side view of a robot diagram 300 with leg elements 302 that can be configured to move in and out of a frontal plane 304 and/or a sagittal plane 306 (FIG. 3B) in order to maintain support of the robot during various modes of operation and keep the robot 300 in an upright configuration. As such, the motors can be used to maintain a number of joint angles (308-3214) of the leg elements 302. The specific joint angles illustrated can be manipulated by the various motors and motor controls to establish a base support system for the robot primarily during walking mode in order to keep the robot in the upright configuration.

In numerous embodiments, the controller(s) may be based on an inverted pendulum model in which the center of mass resides at a higher point than the contact point of the legs. As described previously, the legs in a number of embodiments can be designed to be lightweight placing the majority of the mass of the robot within the body or at the upper most portion of the legs. Accordingly, various embodiments may implement a leg geometry that has a distinct effect on the functionality and ability for the robot to operate efficiently in a walking mode based on an inverted pendulum model. For example, FIG. 3A illustrates an embodiment of a robot 300 with leg elements 302 that are configured in two separate closed kinematic loops 316 and 318. The multiple kinematic loops 316 and 318 can allow for sufficient support to be provided to the upper torso during walking mode. Additionally, the different kinematic loop configuration can allow the leg elements 302 to be located closer to the body or torso during flight modes, which can also allow for a more compact design.

With respect to the Inverted Pendulum model, the height of the center of mass (CoM) can be kept constant by controlling the leg extension force. In this case, the dynamics become linear in a Cartesian coordinate parameterization. This model is called Linear Inverted Pendulum (LIP) and can be used to generate the walking trajectory of a robot, in accordance with various embodiments. Since the CoM stays at a constant height, there are no impulsive ground reaction forces due to impact when the robot makes a step. Accordingly, the walking trajectory controls can exploit the linearity of the model to find closed-form solutions for foot placements and CoM trajectories. While simple in formulation, versatile walking patterns are possible with this method by modifying walking characteristics through different choices of a step period, a step length, or a desired CoM height. Because of its simplicity, the trajectories can be easily computed online, thus allowing for a continuous trajectory generation during walking.

Figure 4B:
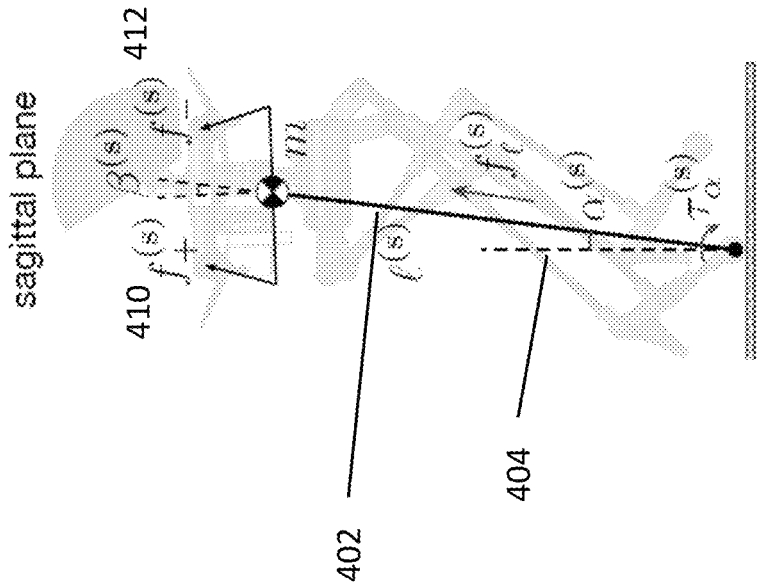
FIGS. 4A through 4C illustrate moment force diagrams of a multi-modal robot in accordance with embodiments of the invention
Figure 4A:
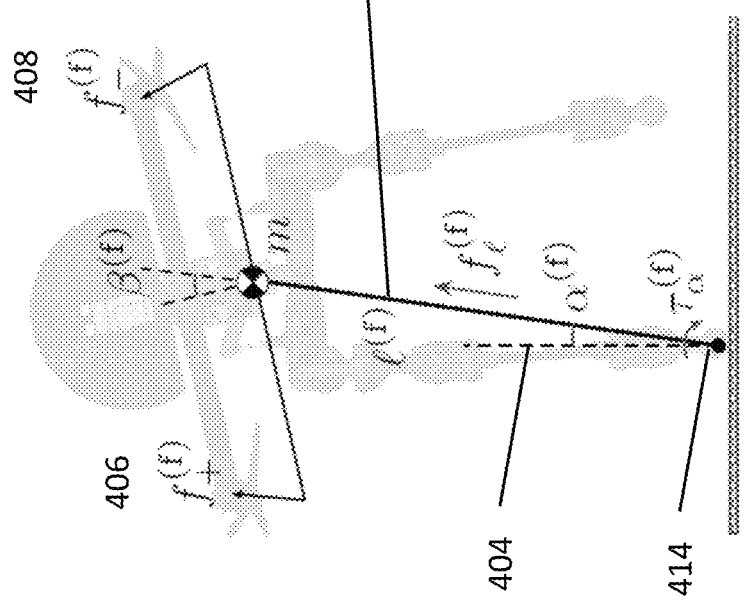
Figure 4C:
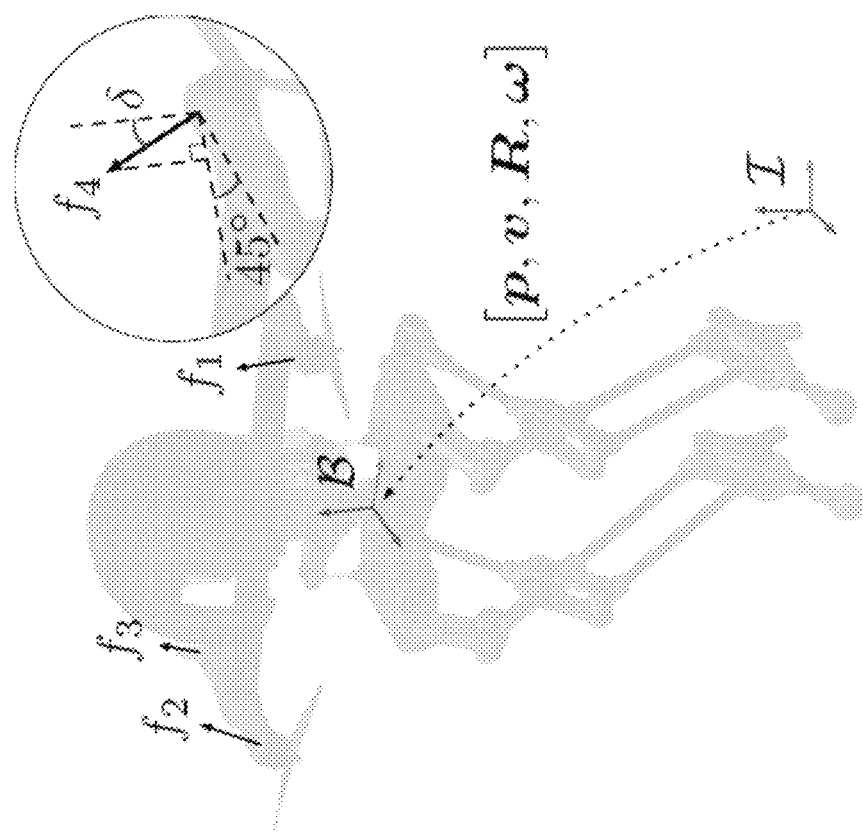

Many embodiments of the control architecture can be modified with the addition of a constant, uniform thrust on the propellers or propellers, as illustrated in the force diagrams in FIGS. 4A through 4C. The thrust generated from the propellers can reduce the weight on the legs or the effect of the weight of the legs on the robot through the constant upward force 302. Additionally, choosing the torso attitude level ($\beta=\alpha$), the constant propeller thrust enters the dynamics like a reduced gravitational acceleration, illustrated in equation 1 below.

$$\ddot{x} = \frac{g - f_z/m}{z} x. \tag{1}$$

Here, the x and z coordinates are the horizontal and vertical positions of the CoM with respect to the stance foot location. Additionally, g represents the gravitational acceleration. The resulting trajectory looks natural, with the CoM swinging side-to-side as the robot makes steps. These trajectories require only the chosen constant thrust to be followed, minimizing the control action needed. The swing leg trajectory is parameterized such that it lifts and sets the foot down vertically and moves in between stance locations in a straight line.

Once the feet and CoM trajectories generated, the relative foot trajectories can be transformed into the associated joint angle trajectories to be tracked by a set of servo motors. This requires solving an inverse kinematics problem of the leg chain. Within the work space of the legs there is a unique feasible joint configuration for any foot position, which makes the inverse kinematics a well-posed problem. The inverse kinematics problem can be solved by first finding $\theta_3$ (FIG. 2B) in the frontal plane analytically and then numerically solving for $\theta_1$ and $\theta_2$ by finding the solution of the function in equation 2 below.

$$\left\{ \begin{array}{c} p^d_{foot} - p_{foot}(\theta_1, \theta_2, \phi_1, \phi_2) \\ p_{loop_1}(\theta_1, \phi_1) - p_{loop_2}(\theta_2, \phi_2) \end{array} \right\} = 0, \tag{2}$$

where $p_{foot}^d$ is the desired foot position in the plane of the parallel leg mechanism. The kinematics can be over-parameterize with the additional angles $\phi_1$ and $\phi_2$ and a constraint can be added to that the point $p_{loop}$ is the same from both sides of the kinematic chain, i.e., $p_{loop_1}=p_{loop_2}$. This results in much simpler expressions compared to an analytic solution of $p_{loop}$ based on $\theta_1$ and $\theta_2$ only, which speeds up the computation. Note that the second kinematic loop is a parallelogram which makes the computation of $p_{foot}$ as a function of $p_{loop}$ and the angles $\theta_1$, $\theta_2$, $\phi_1$, and $\phi_2$.

A diagram of the considered model, in accordance with numerous embodiments, is shown in FIGS. 4A and 4B. Conceptually, as previously mentioned, this model can be seen as a projection of a full 3D model onto the frontal or sagittal plane. In this model, the robot's configuration can be parameterized by an angle $\alpha$ between the virtual leg 302 and the inertial vertical axis 304, and the link length $\ell$. Thus, the vector of generalized coordinates can be defined as $q^i:[\ell^i, \alpha_i]^T$, with i={(s), (f)}, corresponding to the sagittal and frontal planes, respectively (e.g., $q^i=q^{(s)}$ or $q^i=q^{(f)}$). Using the Lagrangian method, the equations of motion for this model can be put in the following Euler-Lagrange form:

$$M^i(q^i)\ddot{q}^i + C^i(q^i, \dot{q}^i)\dot{q}^i + G^i(q^i) = \begin{bmatrix} f^i_\ell \\ \tau^i_\alpha \end{bmatrix}, \text{ where} \tag{3}$$

$$M^i = \begin{bmatrix} m & 0 \\ 0 & m(\ell^i)^2 \end{bmatrix}, C^i = \begin{bmatrix} 0 & -m\ell^i\dot{\alpha}^i \\ m\ell^i\dot{\alpha}^i & m\ell^i\dot{\ell}^i \end{bmatrix}, G^i = \begin{bmatrix} mg\cos(\alpha^i) \\ -mg\ell^i\sin(\alpha^i) \end{bmatrix},$$

and $f_l^i$ is the kick force at the prismatic joint along the virtual link and $\tau_\alpha^i$ is the moment generated by the propeller thrusts and $f_+^i$ about $f_-^i$ the pivot point. Note that β does not have any dynamics in this model, however in reality, it is controlled by the leg servomotors, which have limited bandwidth. Therefore we do not assume control of $β^i$ for stabilization in this model.

In accordance with many embodiments a nonlinear integral controller in a walking mode while using propellers for added support. Such configuration can allow for exponential convergence of the angle trajectory $α^i$ to a desired trajectory $α_d^i$. To do this, the inverted pendulum model can be used while restricting it to one coordinate ($α^i$). This can be done because it can be assumed that the servo motors embedded in the legs are tracking the leg angle and length. This is in contrast to the ideal case of the planned LIP trajectory, because impacts can occur when the foot exchange does not happened at the planned time due to tracking errors or due to uneven terrain. However, such impacts are neglected in the controller's stability analysis. This can be justified by the exponentially fast convergence of tracking errors to the impact-less reference trajectory before the next leg exchanges. Note that since this controller stabilizes the planar model, two instantiations are run to control the sagittal and frontal plane individually.

In accordance with numerous embodiments, the heading of the robot can be controlled using the propellers as illustrated in FIG. 1 and the force diagrams in FIGS. 4A through 4C. As illustrated previously, the feet of the robot can form point contacts with the ground, thus allowing the robot to freely rotate in all three axes, including yaw, when only one foot is in ground contact. In this case, the propellers can be used to control the heading of the robot using a Proportional-Integral-Derivative (PID) controller. The controller outputs a yaw moment that is mixed with the desired pitch and roll moments from the walking tracking controllers.

Various embodiments of a control system can combine the calculated control moments in order to generate propeller signals. For example, the heading and moments from the legs 402 can be managed by the individual thrust generated by the propellers 406 through 412. It can be appreciated that the individual propeller thrusts can be tracked along side the leg moments and therefore adjusted in order to control or maintain the desired moments of the legs during a walking mode. Accordingly, each of the propeller thrusts can be adjusted in order to minimize the overall net thrust on the robot to allow for the legs to generate the majority of the walking motion. Likewise, the propeller thrusts can be increased and/or decreased based on the tracked motion from the leg elements 402 to ensure ground contact is maintained by the feet. As such the foot sensors 414 can be used help regulate the thrust of the propellers.

Figure 5:
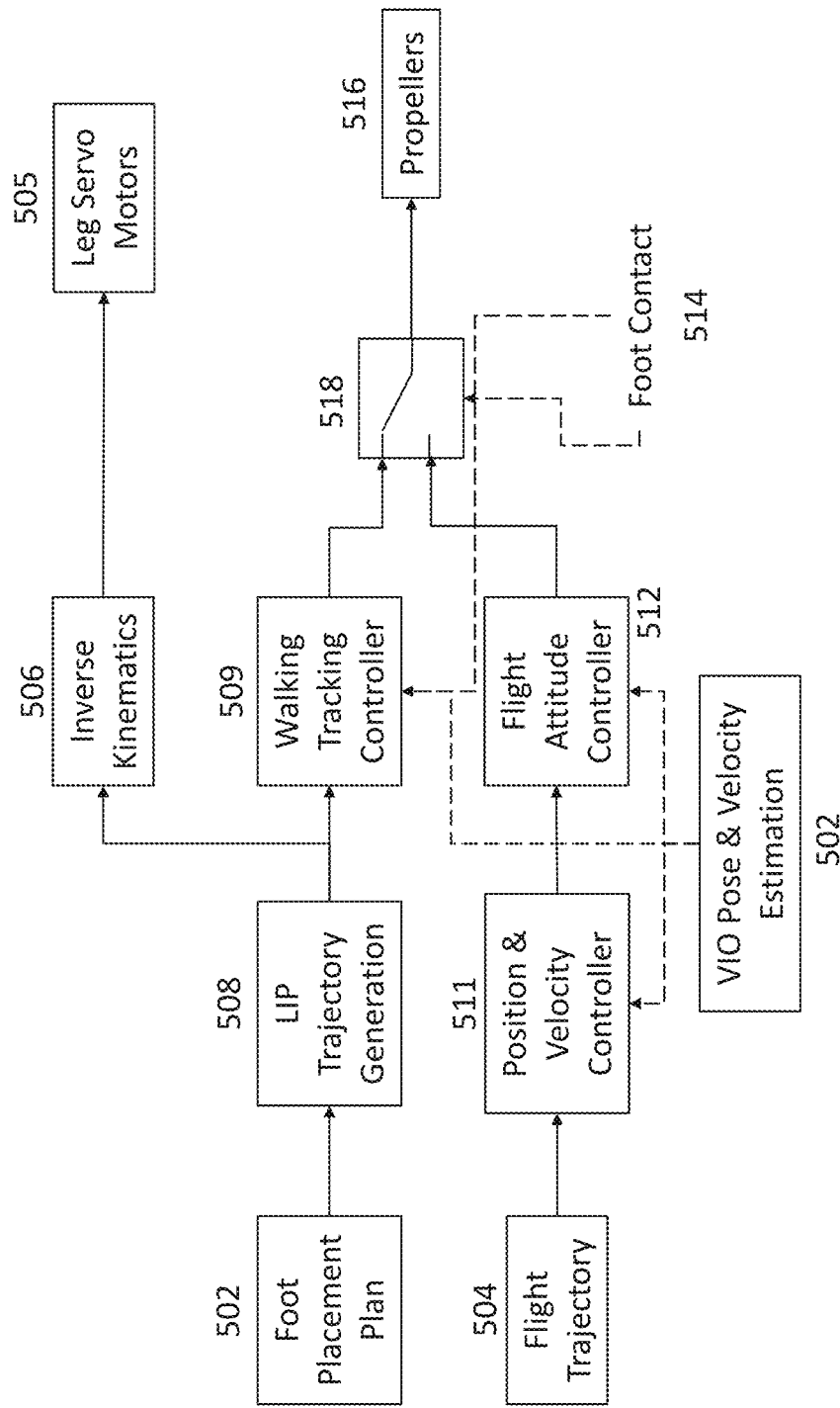
FIG. 5 illustrates a control architecture in accordance with embodiments of the invention

As can be readily appreciated, the control architecture can be used to manipulate the legs and propellers of the robot to perform a number of different functions. For example, FIG. 5 illustrates a robotic control architecture system in accordance with various embodiments. As indicated above, control systems can establish a foot placement plan (502) as well as a flight trajectory (504). The foot trajectory can be directed to leg servo motors 505 based on calculated inverse kinematics 506 for appropriate leg motion whether in walking or flight mode. In accordance with numerous embodiments, the walking and flight trajectories (502 and 504) can be input to the various walking and flight controllers (508, 509, 511, and 512). The walking and flight controllers (508, 509, 511, and 512) can then determine where appropriate power distribution can be managed. Additionally, the control system can be connected to various input devices such as foot contact elements 514 that can provide feedback to the overall system. The foot contact elements 514 can be a switch that can indicate the need for increased power to be diverted to the leg servo motors 505 in a walking mode. As can be appreciated, in a walking mode the walking tracking controller 509 can be configured to control the propellers 516 by way of a switch element 518 such that the propellers 516 are providing enough support to allow the leg servo motors 505 to direct the movement of the robot. In contrast, the control of the propellers 516 can be moved to flight and attitude controller 512 when the robot transitions to a flight mode. Accordingly, the activation or deactivation of the foot contact elements 514 can be used as input to determine the switch position between walking control and flight control. In conjunction with the walking controllers (508 and 509) and the flight controllers (511 and 512) cameras or other sensors can be used to provide pose and velocity estimation (520) to the various controllers to allow for the robot to navigate various environments, including adverse terrain.

Figure 6A:
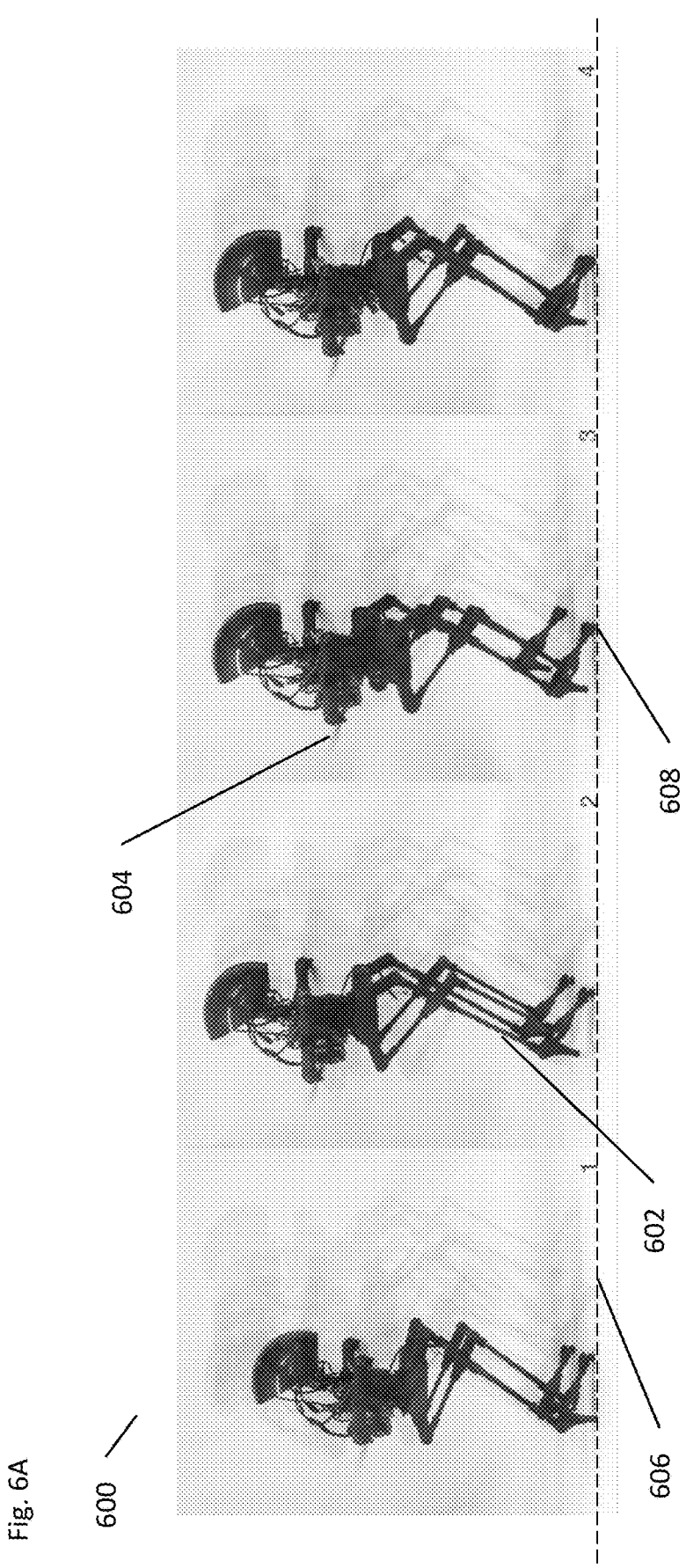

FIGS. 6A and 6B are photographic segments of a robot 600 walking in accordance with embodiments of control systems implemented within a multi-modal robot. The legs 602 and propellers 604 are operated in synchronization in order to perform a walking mode on a solid surface 606. The walking mode can be augmented with the input from the foot sensors 608 in order to effectively operate or control the thrust of each of the propellers to enable the walking mode. Similarly, FIG. 7 illustrates an embodiment of a robot 700 that is moving side wards on a tightrope 702 as one possible mode of operation. Similar to walking the control, the robot control systems can utilize the propellers 704 in conjunction with the leg elements 702 to move across a rope like element 706.

Figure 8:
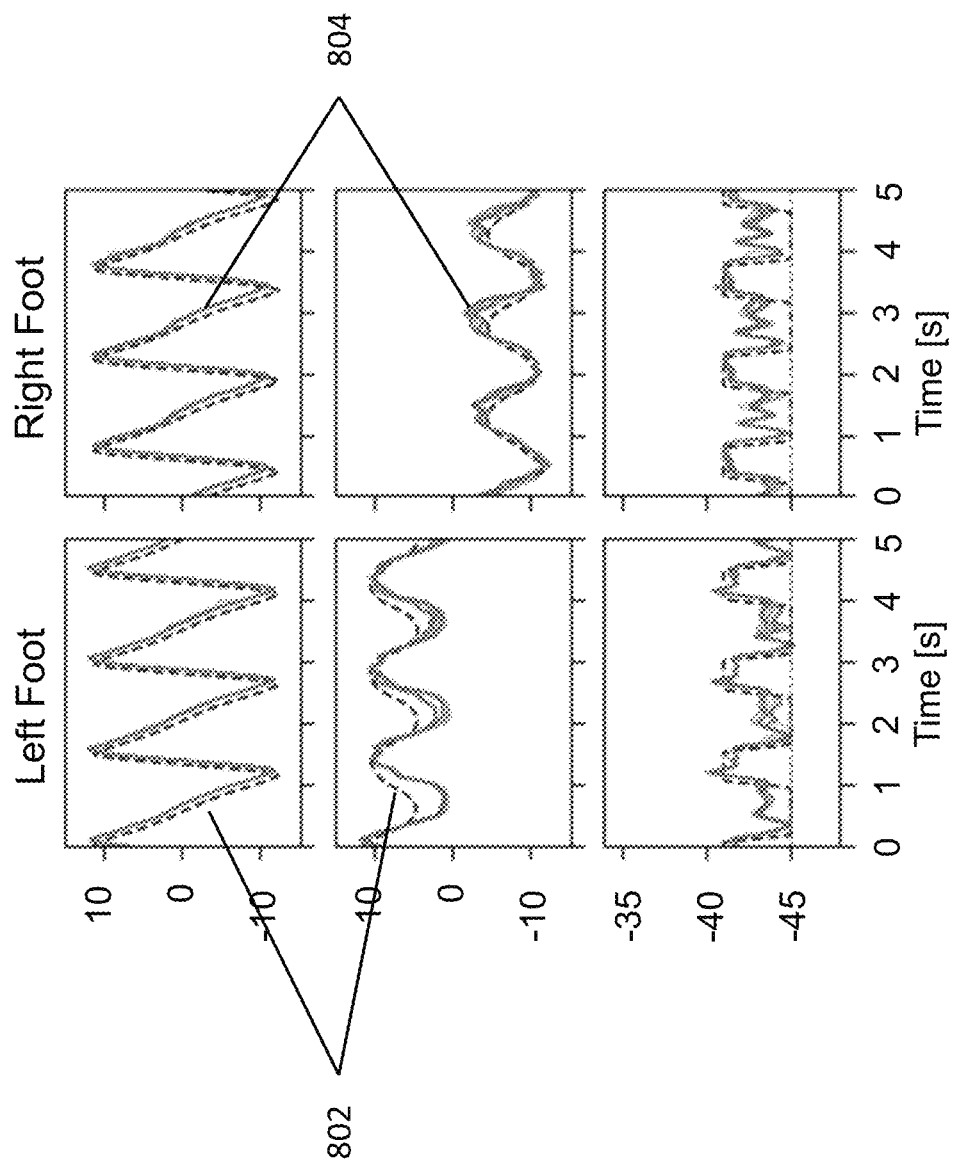
FIGS. 8 and 9 illustrate walking trajectories of a multi-modal robot in walking mode in accordance with embodiments of the invention
Figure 9:
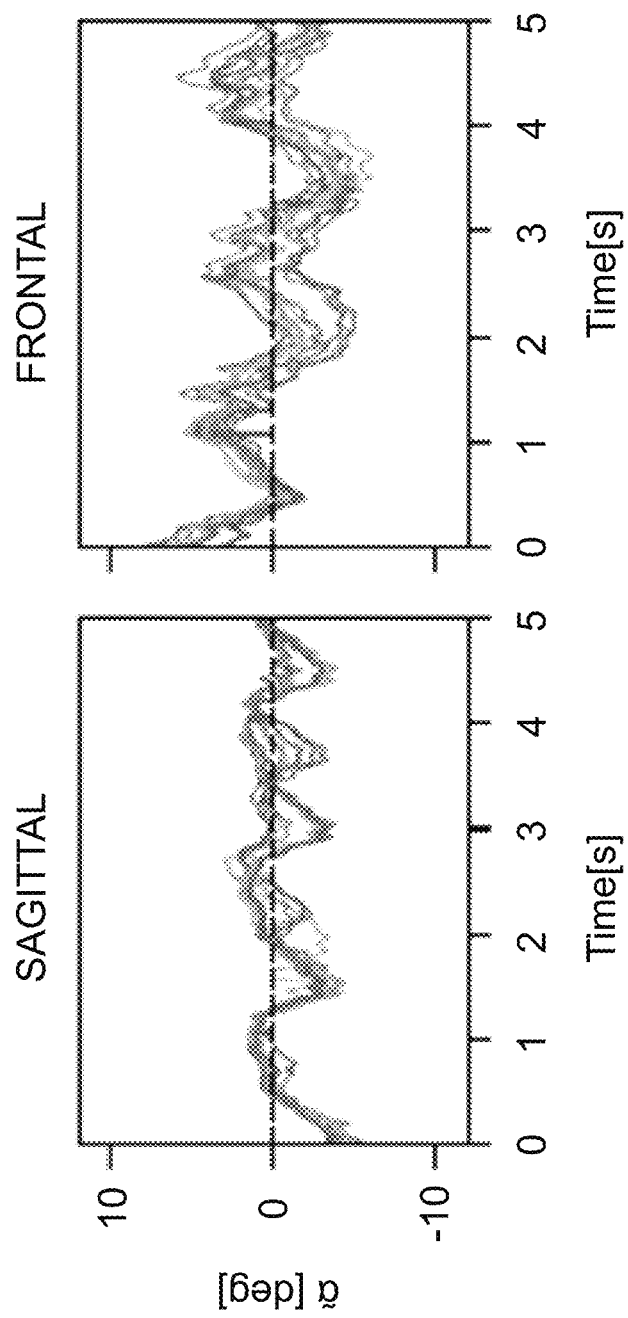
Figure 10:
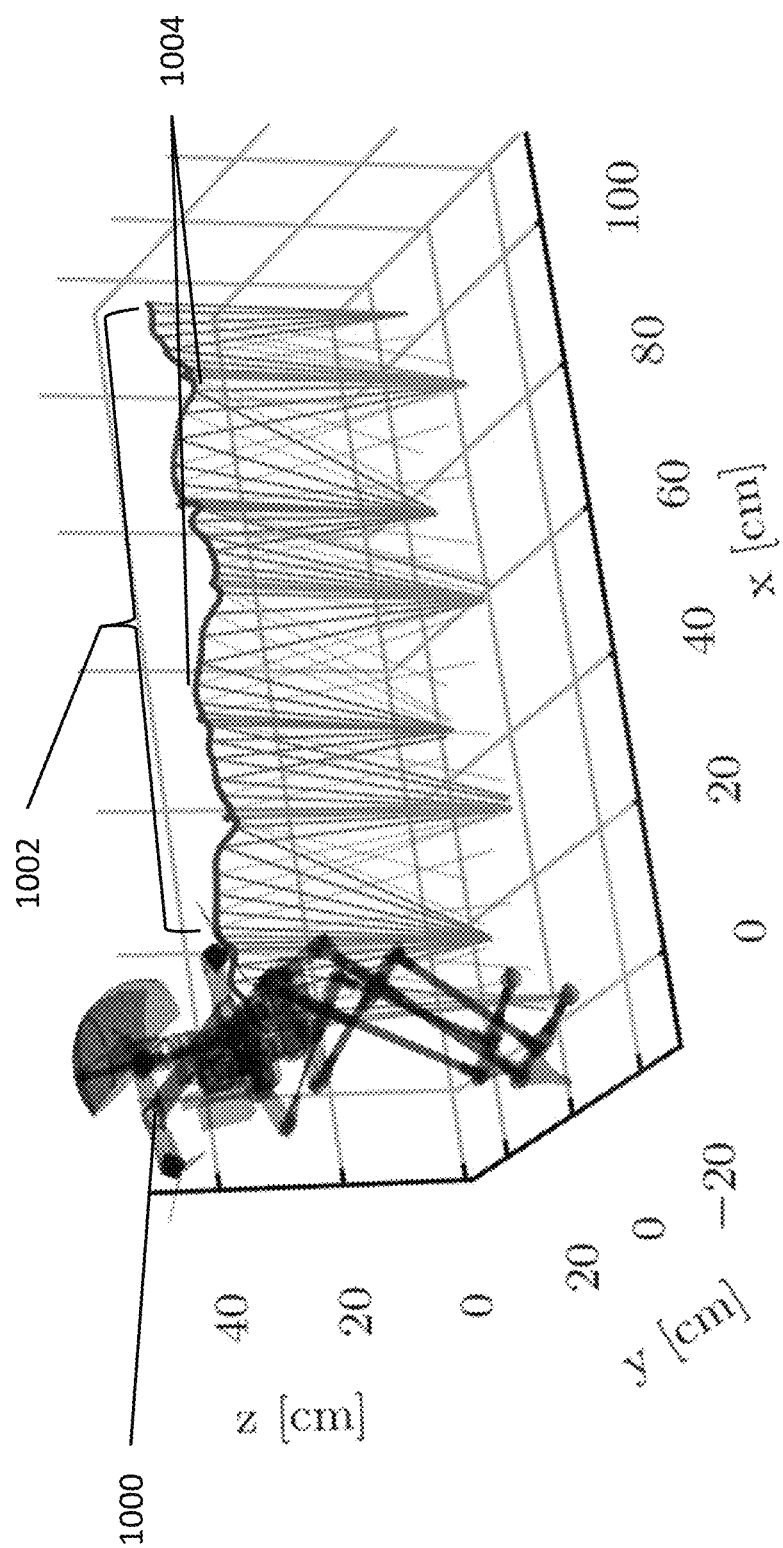
FIG. 10 is a graphical illustration of a robot walking trajectory with interference in accordance with embodiments of the invention

Accordingly, FIGS. 8 through 10 illustrate the tracking of the robot in a walking mode based on the various trajectories of the foot elements. For example, FIG. 8 illustrates the position of the left and right feet with respect to the center of mass in the body axes. The dashed line 802 makes the desired foot location and the solid line 804 illustrates the actual foot location. The delay in projected versus actual location can be related to the actual forces applied to the feet elements during walking. As such, many embodiments can utilize the thrust of the rotors to compensate for the additional loads. FIG. 9 illustrates the walking trajectory tracking errors of the nonlinear controller in the sagittal and frontal planes. FIG. 10 further illustrates the trajectories of the robot 1000 in a walking mode with a number of different disturbances affecting the robot. For example, the walking trajectory 1002 illustrates various deviations 1004 along the trajectory related to external disturbance and the associated response from the robot, to include the associated propeller response. As can be seen, the non-linear tracking controller, in accordance with various embodiments, can control the movement of the leg elements and rotors in synchronization in order to maintain the upright stance and forward movement of the robot 1000.

Figure 11:
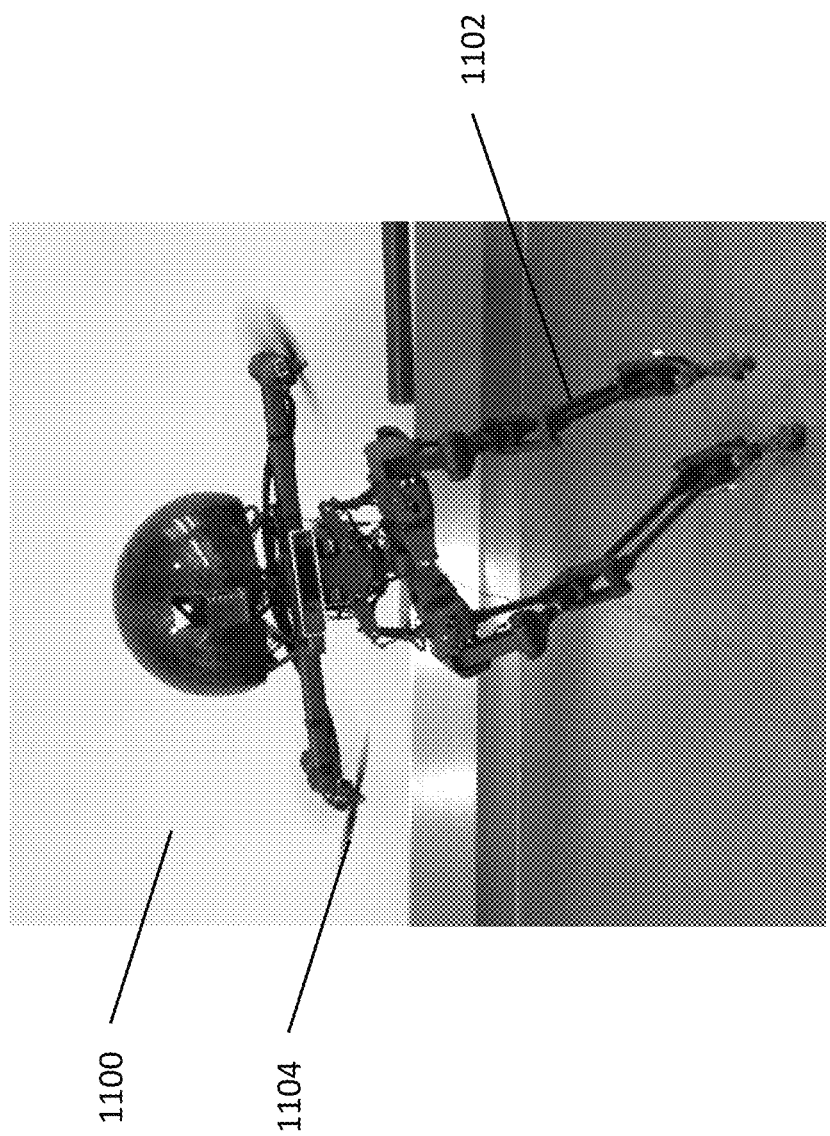
FIG. 11 is a pictorial illustration of a robot in walking mode with external interference in accordance with embodiments of the invention
Figure 12:
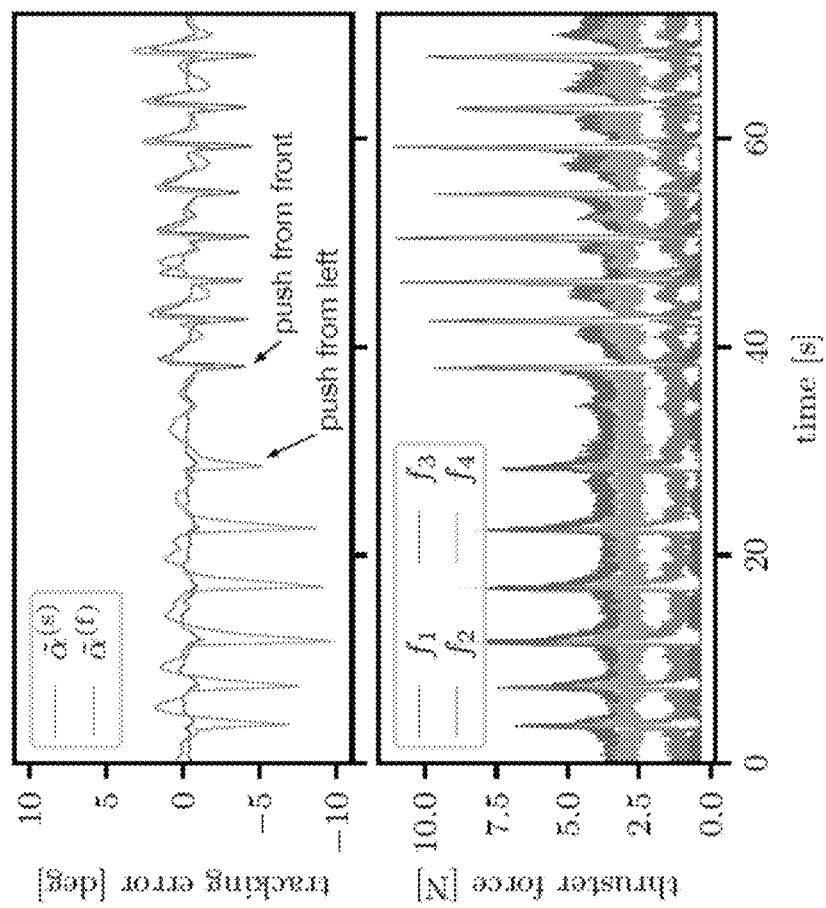
FIG. 12 is a graphical illustration of the flight control responses in accordance with embodiments of the invention

Similar to FIG. 10 FIGS. 11 and 12 illustrate the controlled response of a robot 1100 in accordance with outer disturbances that can arise from uneven terrain, wind, or impact with other objects. As can be seen in FIG. 11, the robot 1100 is leaning to one side but still in a relatively upright position. Accordingly, FIG. 12 is a graphical illustration of the tracking error and response force from the propellers in order to maintain an upright configuration as well as maintain the relative trajectories. As can be appreciated, many embodiments may incorporate a nonlinear controller architecture to synchronize the movement of the legs 1102 and the propellers 1104 in a manner that allows for improved control of the robot 1100 across a variety of different terrains and different obstacles.

Figure 13:
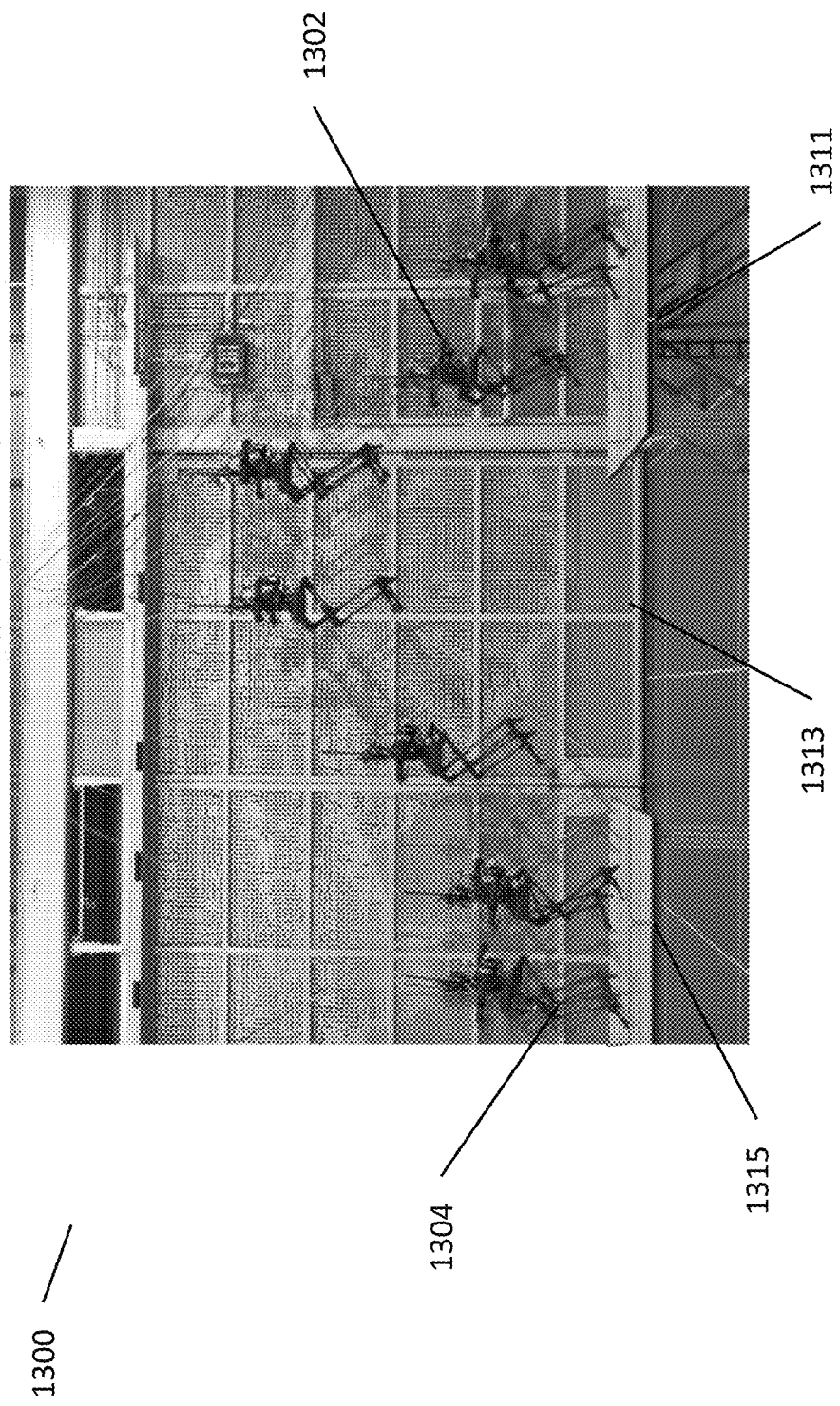
FIG. 13 is a pictorial illustration of a robot transitioning from takeoff, flight, and landing modes in accordance with embodiments of the invention
Figure 14:
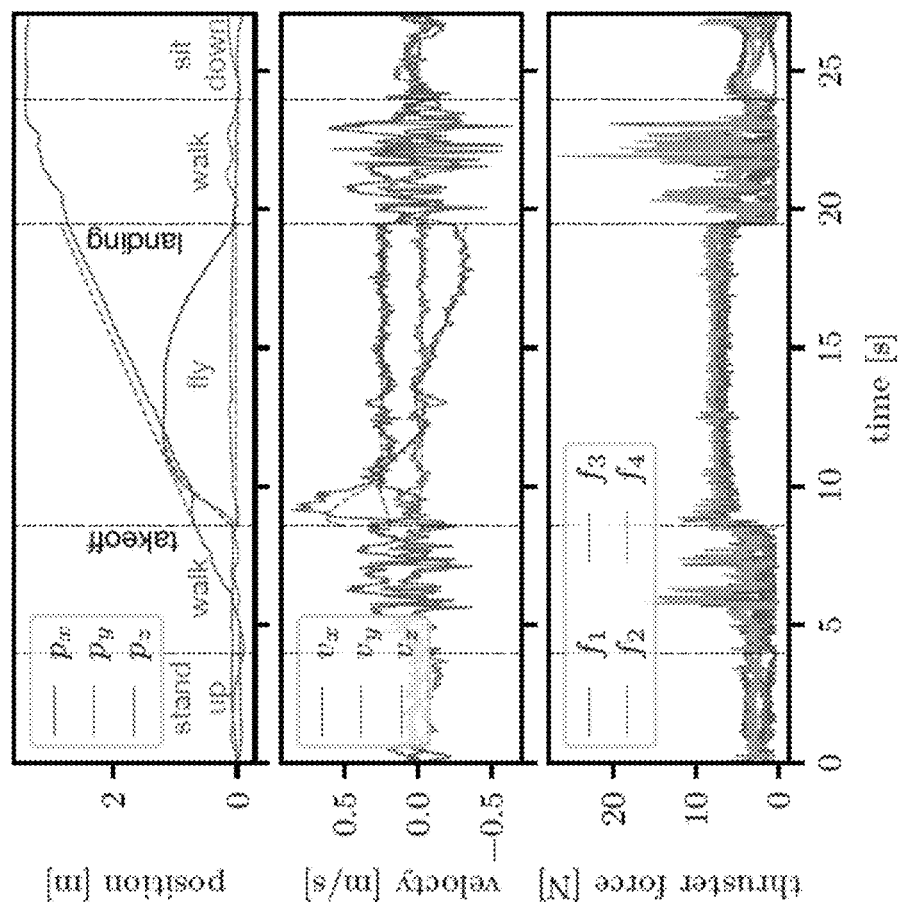
FIG. 14 is a graphical illustration of the flight control responses during various modes in accordance with embodiments of the invention

Similar to the control architecture used to maintain a walking mode of the robot, the propellers and legs can be used to transition between walking and flying modes. For example, FIG. 13 is a photographic illustration of a robot 1300 in takeoff, flight, and landing states, in accordance with various embodiments. In accordance with numerous embodiments, the robot 1300 can utilize the propellers 1302 to take off (1311) and then flight (1313) and subsequently landing (1315). Once landed, the robot 1300 can then operate the legs 1304 in conjunction with the propellers 1302 to begin a walking mode of operation. Accordingly, FIG. 14 is a graphical illustration of the controls response between the different modes of operation including, walking, takeoff, flying, landing and subsequent walking modes.

Control Methodology

Figure 15:
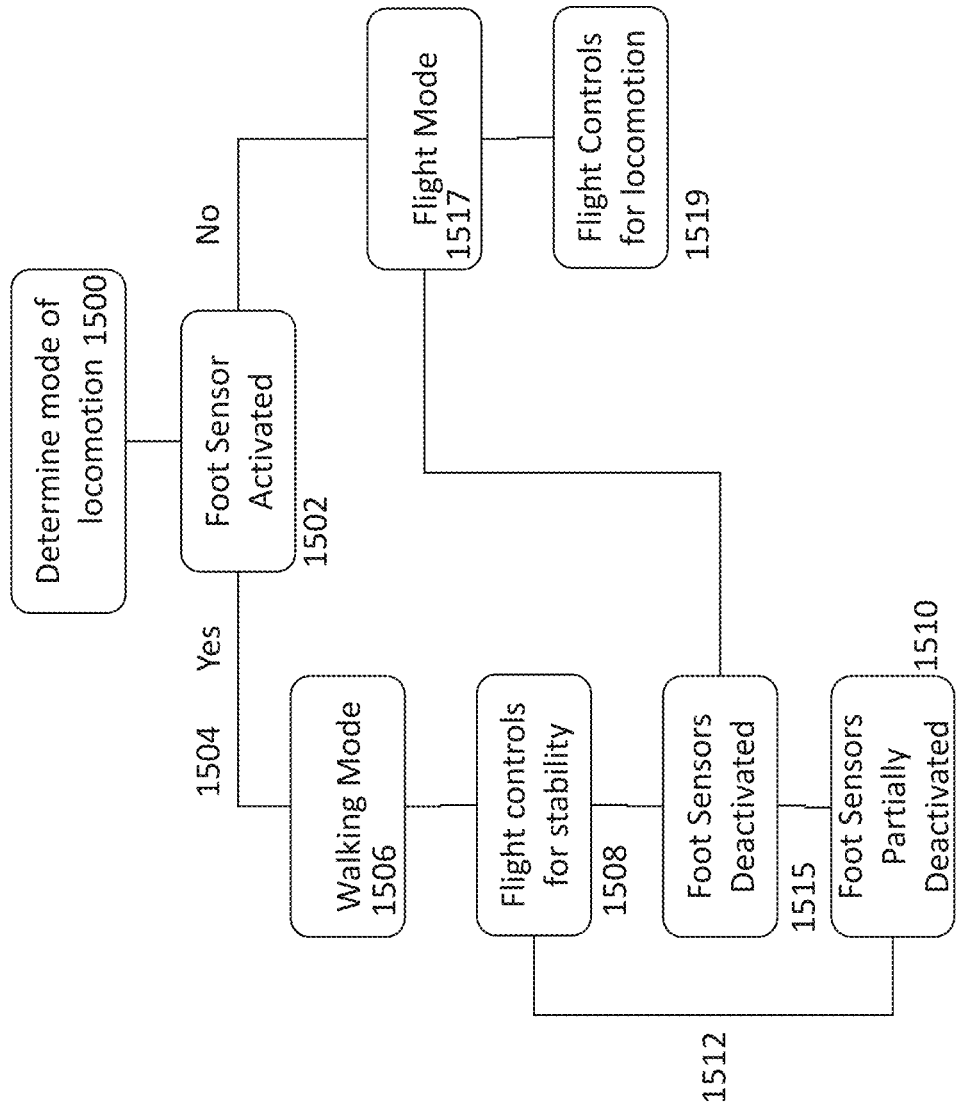
FIGS. 15 through 18 illustrate a control methodologies in accordance with embodiments of the invention

As can be appreciated, the synchronized non-linear control architecture in conjunction with the various structural and functional components of the robot can be used in a number of different methods thereby operating the robot. For example, FIGS. 15 through 18 illustrate various methods of operation in accordance with embodiments. FIG. 15 illustrates a method of determining the necessary mode of operation (1500) base on the activation of the foot sensors (1502). For example, if the foot sensor is activated (1504) the control systems can initiate a walking mode (1506). In the walking mode, the flight controls and/or rotors can be used to maintain the stability of the robot (1508). As can be appreciated, the foot sensors will activate and deactivate as the foot elements lift and then set back down on the ground. Accordingly, if a partial deactivation (1510) of the foot sensors is registered, as is to be expected by walking, then the flight controls will remain active 1512 to keep the robot balanced for walking. Alternatively, if the foot sensors are completely deactivated (1515) then the control systems can initiate a flight mode (1517). As such, the flight control systems can manage control of the robot for flight (1519).

Figure 16:
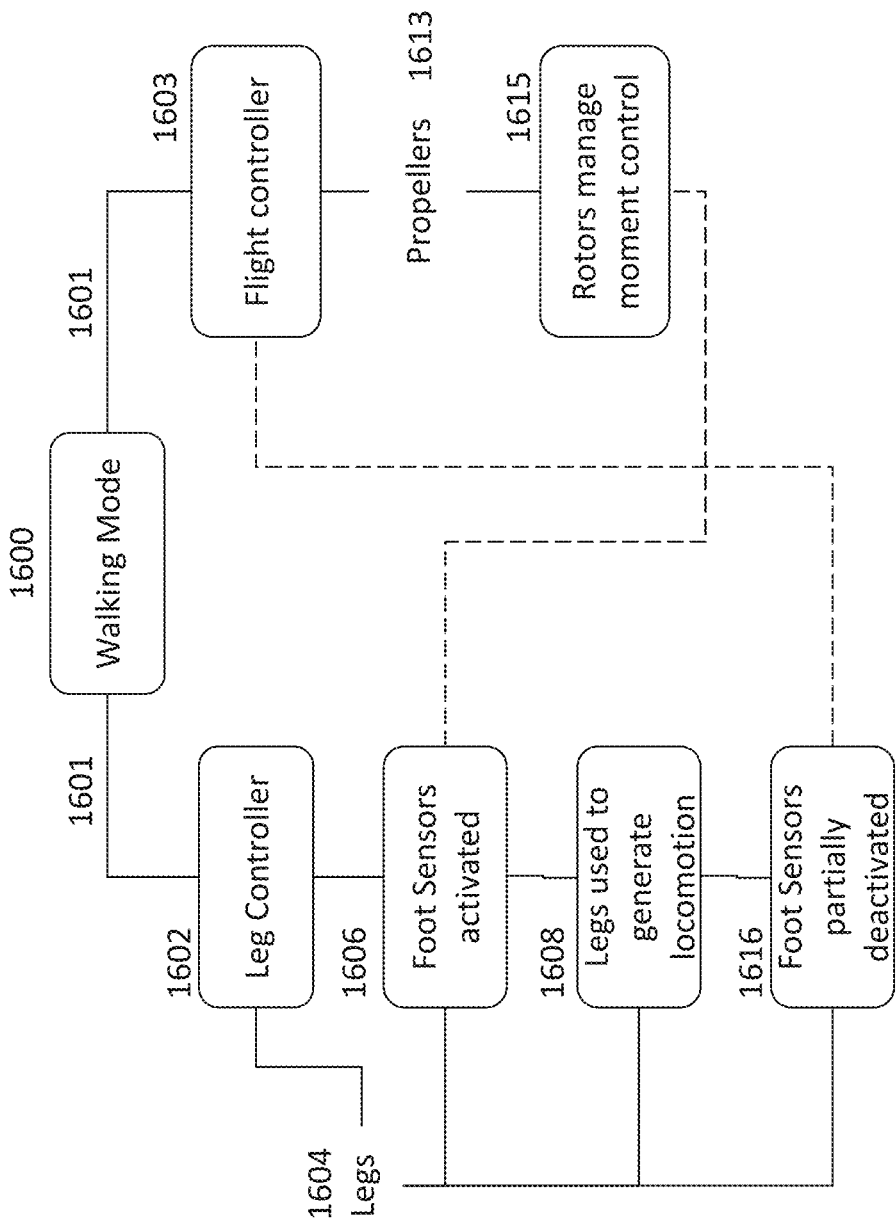

Similar to the methods used in FIG. 15, FIG. 16 illustrates a method for controlling the robot in walking mode 1600. When in a walking mode, the control system can direct control signals 1601 to the leg controllers 1602 as well as the flight controller 1603 to initiate movement of the legs 1604. Accordingly, the movement of the legs can naturally activate the foot sensors (1606) which will signal to the leg controller 1602 to continue operating the legs for locomotion (1608). In conjunction, the flight controller 1603 can be used to activate the propellers 1613 to help stabilize the movement or manage the moment control of the robot (1615) that is generated primarily by the legs in a walking mode. Similarly, when the foot sensors are partially activated (1616) or deactivated as a result from walking, the flight controller 1603 can continue to manage the moment control (1615) of the robot. This process can continue so long as the robot is walking. Once the object of the robot is to fly, it can utilize the various leg 1602 and flight 1603 controllers to initiate a flight mode.

Figure 17:
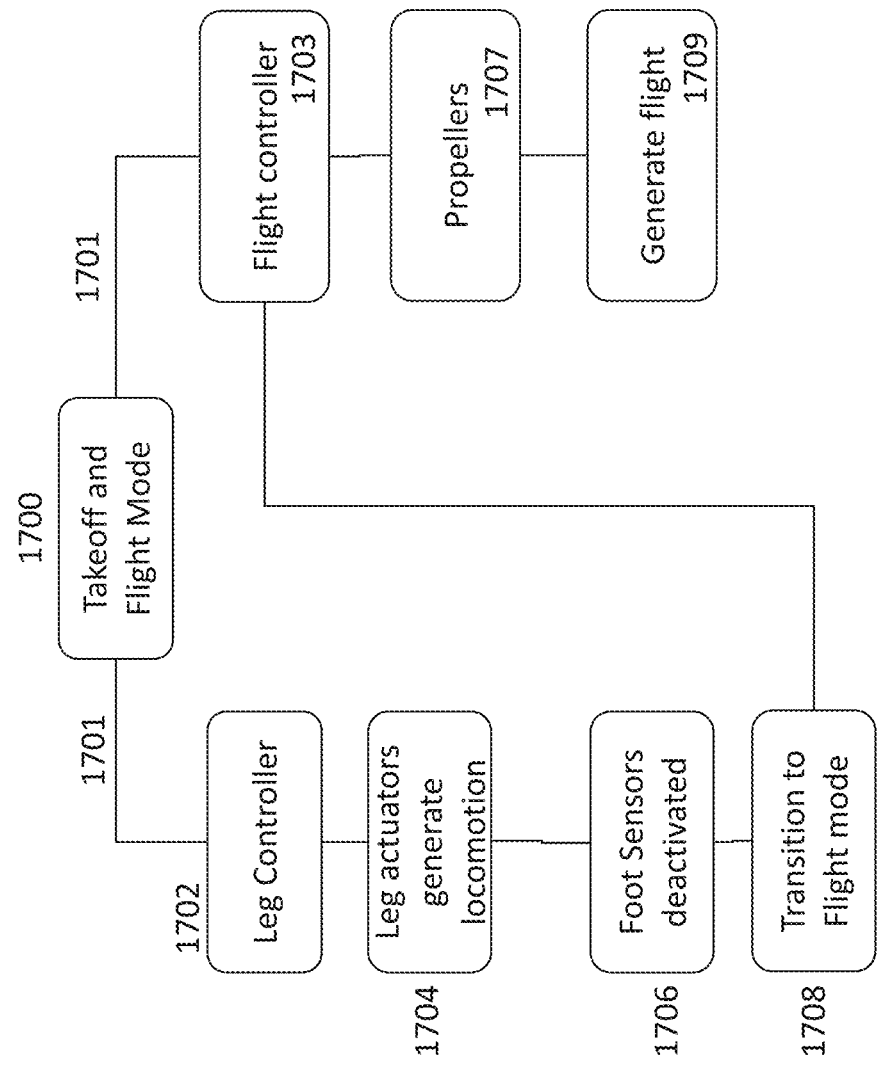

In accordance with numerous embodiments, the robot can begin the transition to flight through a takeoff mode as illustrated in FIG. 17. The robot can transition into a take off mode 1700 by sending signals 1701 to both the leg controller(s) 1702 and the flight controllers 1703 to initiate transition into flight mode. The leg controller 1702 can initiate movement in the legs (1704) which can subsequently deactivate the foot sensors (1706). Once the foot sensors are deactivated (1706) the control of the robot can fully transition (1708) to the flight controller 1703. The flight controller 1703 can then utilize signals from the variety of sensors on the robot including the propellers 1707 to control elevate the robot or generate flight (1709) and take off from a standing or even a walking mode. Once the robot is fully engaged in flight mode where the propellers 1707 in conjunction with other sensors previously discussed can be utilized and/or controlled from the controllers and computers to navigate the movement of the robot in flight mode.

Figure 18:
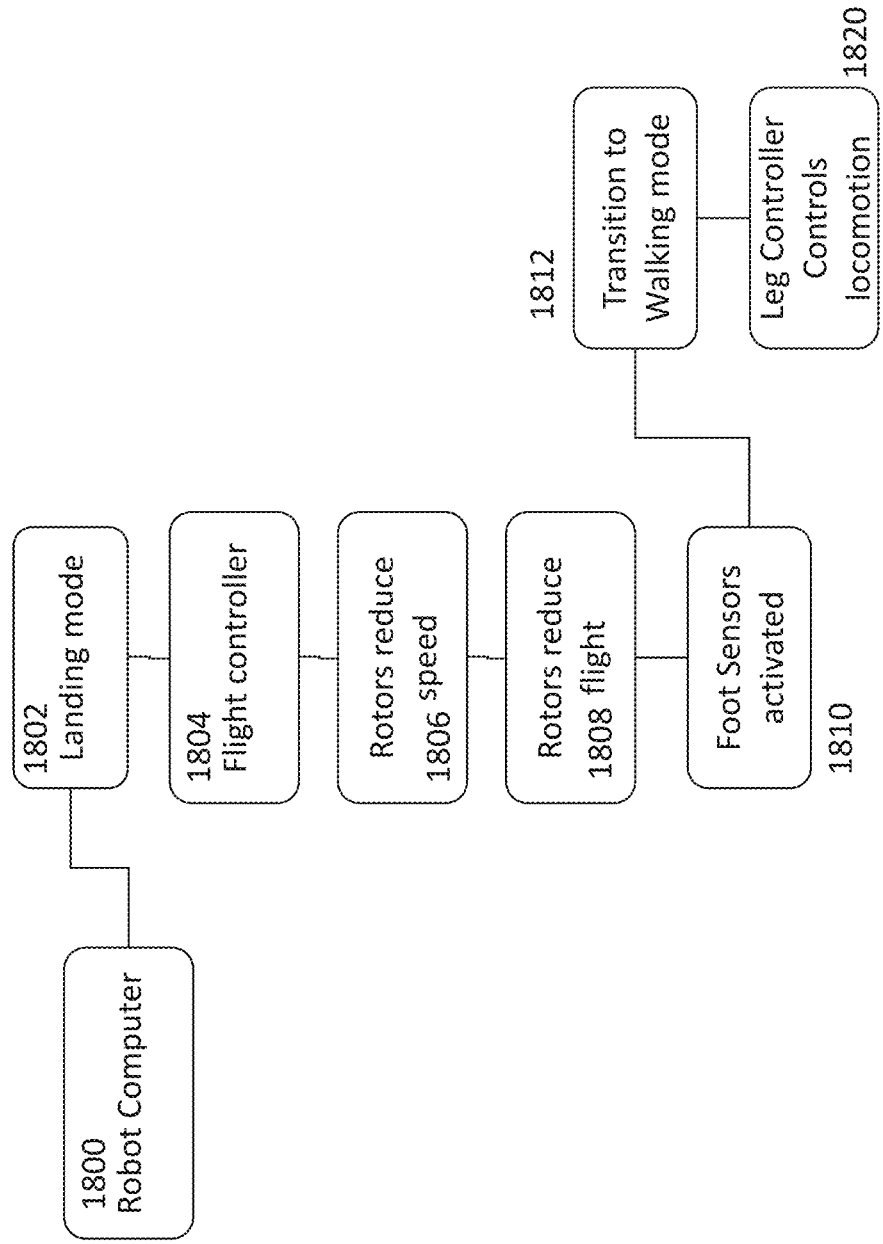

As can be appreciated, and as has been previously discussed, many embodiments of a robot are configured to be multi-modal and therefore, it can be more fully appreciated that a robot in flight mode may have the ability to transition between flight and walking mode by initiating landing. For example, FIG. 18 illustrates a process diagram of a method for transitioning from flight mode into landing mode. This can be the case for a number of different scenarios including, but not limited to the reduction of power and/or the need to walk, such as in the need to deliver a payload. Accordingly, the main computer 1800 can determine the need to transition to walking by initiating a landing mode (1802). The flight controller 1804 can control or slow the rotation of the propellers (1806) such that the height of the robot is reduced or such that the robot begins to lose elevation (1808). As the robot touches down on a solid surface the foot sensors can be activated (1810) which can indicate to the various controllers and computer systems that the robot is to transition to walking mode (1812). From there the leg controller can begin movement of the legs (1820) in order to operate the robot in a walking mode.

Although the present invention has been described in certain specific aspects, many additional modifications and variations would be apparent to those skilled in the art. It is therefore to be understood that the present invention can be practiced otherwise than specifically described including a multi-modal robot capable of a walking mode and a flight mode with a number of propellers used during walking mode for stability without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A multi-modal robot, comprising:
a body;
a plurality of control electronics disposed within the body portion, wherein the plurality of control electronics includes at least a leg controller and at least one flight controller;
a plurality of motor elements disposed within the body;
at least two leg elements each of the at least two leg elements connected to at least one of the plurality of motor elements and having a proximal portion and a distal portion where the proximal portion is move-ably coupled to the motor elements and disposed near a bottom portion of the body and wherein each of the two leg elements has a foot element disposed on the distal portion and having a top and a bottom surface wherein the foot element comprises a contact sensor disposed on the bottom surface, wherein the contact sensor is in communication with the at least one leg controller and the at least one flight controller;
a plurality of propellers disposed on a top portion of the body wherein each of the plurality of propellers are in communication with the at least one flight controller and the at least one leg controller and configured to generate a thrust force;

wherein the robot is configured to operate between at least a walking mode and at least a flight mode and wherein the control electronics operate to smoothly transition between the walking mode and the flight mode, wherein while in the walking mode the at least two leg elements are configured to support the weight of the robot and wherein each of the leg elements can move in a plurality of directions such that the movement of the legs enables the movement of the overall robot, and the plurality of propellers provide a sufficient amount of lift and orientation stabilization via the generated thrust force so as to provide stability of the robot during the walking mode;

wherein while in the flight mode the at least one flight controller is configured to operate the plurality of propellers such that the thrust force generated from the plurality of propellers generates sufficient lift to elevate the robot above the ground and wherein at least one flight controller controls the plurality of propellers to move the robot in any number of directions; and wherein the contact sensor has an active position and an inactive position, wherein the active position communicates a signal to the leg controller and the at least one flight controller thus indicating the need to perform in the walking mode and wherein when the contact sensor is in the inactive position for an elongated period of time a signal is communicated to the at least one flight controller thus indicating the need to perform in the flight mode.

2. The multi-modal robot of claim 1, wherein each of the plurality of propellers are positioned at an angle leaning inwards towards the body of the robot.

3. The multi-modal robot of claim 2, wherein the tilt direction can be at any orientation and the tilt amount can be between 0 and 90 degrees.

4. A multi-modal robot, comprising:
a body;
a plurality of control electronics disposed within the body portion, wherein the plurality of control electronics includes at least a leg controller and at least one flight controller;
a plurality of motor elements disposed within the body;
at least two leg elements each of the at least two leg elements connected to at least one of the plurality of motor elements and having a proximal portion and a distal portion where the proximal portion is move-ably coupled to the motor elements and disposed near a bottom portion of the body and wherein each of the two leg elements has a foot element disposed on the distal portion and having a top and a bottom surface wherein the foot element comprises a contact sensor disposed on the bottom surface, wherein the contact sensor is in communication with the at least one leg controller and the at least one flight controller;
a plurality of propellers disposed on a top portion of the body wherein each of the plurality of propellers are in communication with the at least one flight controller and the at least one leg controller and configured to generate a thrust force;
wherein the robot is configured to operate between at least a walking mode and at least a flight mode and wherein the control electronics operate to smoothly transition between the walking mode and the flight mode, wherein while in the walking mode the at least two leg elements are configured to support the weight of the robot and wherein each of the leg elements can move in a plurality of directions such that the movement of the legs enables the movement of the overall robot, and the plurality of propellers provide a sufficient amount of lift and orientation stabilization via the generated thrust force so as to provide stability of the robot during the walking mode;

wherein while in the flight mode the at least one flight controller is configured to operate the plurality of propellers such that the thrust force generated from the plurality of propellers generates sufficient lift to elevate the robot above the ground and wherein at least one flight controller controls the plurality of propellers to move the robot in any number of directions;

wherein each of the plurality of propellers are positioned at an angle leaning inwards towards the body of the robot; and wherein the tilt is directed inwards at a 25 degrees angle with respect to the torso vertical axis and directed inwards at a 45 degrees angle in the horizontal plane with respect to the forward direction.

5. The multi-modal robot of claim 1, wherein each of the two leg elements comprise a plurality of moveably interconnected segments, wherein the moveably interconnected segments form an upper kinematic loop and a lower kinematic loop such that each of the kinematic loops can be controlled in a manner so as to allow the robot to operate.

6. The multi-modal robot of claim 1, further comprising a control computer disposed in the body of the robot wherein the control computer is in signal communication with the at least one leg controller and the at least one flight controller to communicate a transition between the walking mode and the flight mode.

7. The multi-modal robot of claim 6, further comprising a plurality of sensors disposed around the body of the robot and in signal communication with the control computer, and wherein each of the plurality of sensors transmits a sensor signal to the control computer wherein the control computer utilizes the sensor signal to determine the movement needed from the legs and the propellers in order to navigate the robot.

8. The multi-modal robot of claim 7, wherein each of the plurality of sensors is selected from a group consisting of gyroscope, magnetometer, camera, ultrasonic sensor, and IR sensor.

9. The multi-modal robot of claim 1, wherein the foot element further comprises a heel element and a toe element disposed on the bottom surface of the foot element and configured to allow the multi-modal robot to stand with the propellers deactivated.

10. The multi-modal robot of claim 9, wherein the contact sensor is disposed within the toe element of the foot element.

11. The multi-modal robot of claim 1, wherein the movement of the multi-modal robot in the walking mode is based on an inverted pendulum.

12. A method for operating a multi-modal robot comprising;
utilizing a control computer disposed within a body of the robot to receive signal inputs from a plurality of sensors;
determining a mode of operation based on the signal inputs from the plurality of sensors;
activating a leg controller in response to the signal inputs and initiating a walking mode, wherein the walking mode utilizes the leg controller to control the movement of at least two legs such that the movement of the at least two legs moves the robot;

activating a flight controller in response to the signal inputs such that the flight controller activates a plurality of propellers such that the propellers generate an amount of lift to the robot so as to provide stability for walking;

wherein at least one of the plurality of sensors is a contact sensor disposed on a bottom portion of each of the at least two legs such that the impact of each of the two legs with a solid surface will place the contact sensor in an active state; and removing each of the at least two legs from the solid surface thereby placing the contact sensor in a deactivated state and transmits the deactivated state to the leg controller and the flight controller such that the flight controller engages the plurality of rotors to generate sufficient lift to raise the robot off of the solid surface and begin a flight mode.

13. The method of claim 12, wherein the mode of operation is selected from a group consisting of flight, walking, and transition.

14. The method of claim 12, wherein each of the plurality of propellers are configured at an angle towards the body of the robot.

15. The method of claim 14, wherein the tilt direction can be at any orientation and the tilt amount can be between 0 and 90 degrees.

16. The method of claim 12, wherein the tilt is directed inwards at a 25 degrees angle with respect to the torso vertical axis and directed inwards at a 45 degrees angle in the horizontal plane with respect to the forward direction.

17. The method of claim 12, wherein each of the two leg elements comprise a plurality of moveably interconnected segments, wherein the moveably interconnected segments form an upper kinematic loop and a lower kinematic loop such that each of the kinematic loops can be controlled along with the plurality of propellers in a manner such that the robot is capable of operating in the walking mode and to transition into the flight mode.

18. A method for operating a multi-modal robot of claim 1, comprising;
utilizing a control computer to receive signal inputs from a plurality of sensors;
determining a mode of operation and transition between modes based on the signal inputs from the plurality of sensors;
activating a flight or a transition controller in response to the signal inputs such that the flight or the transition controller activates a plurality of propellers such that the propellers generate an amount of lift sufficient to produce a flight mode for the robot and wherein the plurality of rotors further generate the orientation stabilization and lift necessary to maintain a stable flight mode; and
activating a walking controller in response to the signal input such that both the thrust force from the plurality of propellers is minimized to provide only stabilization support using the plurality of propellers for the walking mode.

19. The multi-modal robot of claim 4, wherein each of the two leg elements comprise a plurality of moveably interconnected segments, wherein the moveably interconnected segments form an upper kinematic loop and a lower kinematic loop such that each of the kinematic loops can be controlled in a manner so as to allow the robot to operate.

20. The multi-modal robot of claim 4, further comprising a control computer disposed in the body of the robot wherein the control computer is in signal communication with the at least one leg controller and the at least one flight controller to communicate a transition between the walking mode and the flight mode.

21. The multi-modal robot of claim 20, further comprising a plurality of sensors disposed around the body of the robot and in signal communication with the control computer, and wherein each of the plurality of sensors transmits a sensor signal to the control computer wherein the control computer utilizes the sensor signal to determine the movement needed from the legs and the propellers in order to navigate the robot.

22. The multi-modal robot of claim 21, wherein each of the plurality of sensors is selected from a group consisting of gyroscope, magnetometer, camera, ultrasonic sensor, and IR sensor.

23. The multi-modal robot of claim 4, wherein the foot element further comprises a heel element and a toe element disposed on the bottom surface of the foot element and configured to allow the multi-modal robot to stand with the propellers deactivated.

24. The multi-modal robot of claim 23, wherein the contact sensor is disposed within the toe element of the foot element.

25. The multi-modal robot of claim 4, wherein the movement of the multi-modal robot in the walking mode is based on an inverted pendulum.

* * * * *